United States Patent
Dal Pozzo

(10) Patent No.: US 9,550,539 B2
(45) Date of Patent: Jan. 24, 2017

(54) BICYCLE ON-BOARD DEVICE AND RELATED SUPPORT AND MOUNTING METHOD

(75) Inventor: Massimo Dal Pozzo, Rotzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/125,231

(22) PCT Filed: Jun. 8, 2012

(86) PCT No.: PCT/IT2012/000173
§ 371 (c)(1),
(2), (4) Date: Mar. 17, 2014

(87) PCT Pub. No.: WO2012/168958
PCT Pub. Date: Dec. 13, 2012

(65) Prior Publication Data
US 2014/0183839 A1    Jul. 3, 2014

(30) Foreign Application Priority Data

Jun. 10, 2011   (EP) ................................ 11425156
May 18, 2012   (EP) ................................ 12425095

(51) Int. Cl.
*B62J 11/00* (2006.01)
*B62K 19/30* (2006.01)
(Continued)

(52) U.S. Cl.
CPC ............... *B62J 11/00* (2013.01); *B62K 19/30* (2013.01); *B62K 19/40* (2013.01); *B62J 2099/0013* (2013.01)

(58) Field of Classification Search
CPC ............. B62M 6/80; B62M 6/90; B62J 11/00; B62K 19/30; B62K 19/40
(Continued)

(56) References Cited

U.S. PATENT DOCUMENTS 675,390 A    6/1901 Keating
5,470,092 A   11/1995 Fardy
(Continued)

FOREIGN PATENT DOCUMENTS

CH   437013 A    5/1967
CN   1322655 A   11/2001
(Continued)

OTHER PUBLICATIONS

Office Action issued Jun. 6, 2014 in the corresponding European application.
(Continued)

*Primary Examiner* — Tony Winner
*Assistant Examiner* — Michael Stabley
(74) *Attorney, Agent, or Firm* — Volpe and Koenig, P.C.

(57) ABSTRACT

A support for removably fastening a bicycle on-board device having an oblong shape along a bicycle oblong element is disclosed, wherein the support has at least one first opening configured to receive a shank of a first device for fastening to the oblong element, and a second opening configured to receive a shank of a second device for fastening to the oblong element, the first opening and the second opening being spaced along a longitudinal direction of the oblong element, the first opening being configured to receive the shank of the first fastening device alternatively in at least two first positions spaced apart in said first opening, the two first positions being spaced along a direction transversal to the oblong element.

22 Claims, 23 Drawing Sheets

(51) Int. Cl.
*B62K 19/40* (2006.01)
*B62J 99/00* (2009.01)

(58) Field of Classification Search
USPC .............. 280/288.4; 180/206.1, 207.1, 207.3
See application file for complete search history.

(56) References Cited

U.S. PATENT DOCUMENTS

| | | | |
|---|---|---|---|
| 6,016,882 A * | 1/2000 | Ishikawa .................... | 180/207.3 |
| 6,293,448 B1 | 9/2001 | Pietrusynski | |
| 6,923,355 B2 | 8/2005 | Campagnolo | |
| 7,243,937 B2 * | 7/2007 | Ishikawa .................... | 280/288.4 |
| 7,267,352 B2 * | 9/2007 | Ishikawa .................... | 280/288.4 |
| 7,393,125 B1 | 7/2008 | Lai | |
| 7,422,438 B2 * | 9/2008 | Nishimoto .................. | 439/34 |
| 7,934,576 B2 | 5/2011 | Munksoe | |
| 8,162,191 B2 * | 4/2012 | Tetsuka et al. ............... | 224/459 |
| 8,220,679 B2 * | 7/2012 | Yoshida et al. .............. | 224/425 |
| 8,651,212 B2 * | 2/2014 | Vincenz ...................... | 180/205.1 |
| 2001/0042767 A1 | 11/2001 | Campagnolo | |
| 2001/0045723 A1 * | 11/2001 | Niitsu et al. .................. | 280/287 |
| 2002/0052258 A1 | 5/2002 | Meggiolan | |
| 2005/0057017 A1 | 3/2005 | Hara et al. | |
| 2005/0098979 A1 | 5/2005 | Horiuchi | |
| 2005/0126840 A1 | 6/2005 | Lin | |
| 2005/0280244 A1 | 12/2005 | Watarai | |
| 2006/0208453 A1 | 9/2006 | Ishikawa | |
| 2009/0261134 A1 | 10/2009 | Tetsuka et al. | |
| 2010/0237585 A1 | 9/2010 | Binggeli et al. | |
| 2010/0320814 A1 | 12/2010 | Singenberger et al. | |
| 2011/0042156 A1 | 2/2011 | Vincenz | |
| 2013/0241170 A1 | 9/2013 | Talavasek et al. | |

FOREIGN PATENT DOCUMENTS

| | | |
|---|---|---|
| CN | 2631910 Y | 8/2004 |
| CN | 2719694 Y | 8/2005 |
| CN | 101096220 A | 1/2008 |
| CN | 201110489 Y | 9/2008 |
| CN | 101730642 A | 6/2010 |
| CN | 201531177 U | 7/2010 |
| CN | 101850805 A | 10/2010 |
| DE | 19528569 C1 | 8/1996 |
| DE | 202008014756 U1 | 2/2009 |
| DE | 202010005459 U1 | 9/2010 |
| EP | 1553012 A1 | 7/2005 |
| EP | 2221205 A1 | 8/2010 |
| FR | 2564412 A1 | 11/1985 |
| FR | 2602204 A2 | 2/1988 |
| FR | 2603859 A2 | 3/1988 |
| GB | 2260009 A | 3/1993 |
| JP | 04129395 U | 11/1992 |
| JP | H07291167 A | 11/1995 |
| JP | 10157686 | 6/1998 |
| JP | 2002193164 | 7/2002 |
| JP | 2005088880 A | 4/2005 |
| JP | 2005138827 A | 6/2005 |
| NL | 2001779 C2 | 1/2010 |
| TW | M316210 | 8/2007 |
| WO | 0222435 A1 | 3/2002 |

OTHER PUBLICATIONS

Japanese Office Action for Application 2014-514224, issued Oct. 6, 2015 with English translation.
Japanese Office Action for Application 2014-514225, issued Oct. 6, 2015 with English translation.
Chinese Office Action for Chinese Application 2012-10190737.5 dated Sep. 6, 2015.
Chinese Office Action for Chinese Application 2012-80037910.6 dated Sep. 17, 2015.
Japanese Office Action for Japanese Application 2012-130580 dated Jul. 28, 2015.
Chinese Office Action for Chinese Application 201280037857.X dated Jul. 31, 2015.
European Office Action for European Application 12 425 095.2-1755 dated Sep. 21, 2015.
European Office Action for European Application 12 425 094.5-1755 dated Sep. 21, 2015.
Taiwanese Office Action for Application No. 101119339, dated Apr. 6, 2016.
Chinese Office Action for Application No. 201280037857.X, dated Apr. 14, 2016.
Decision to grant a Japanese application corresponding to U.S. Appl. No. 13/493,485 (no English translation available), issued Jun. 20, 2016.
European Office Action for Application No. 12 425 095.2-1755, dated Apr. 21, 2016.

* cited by examiner

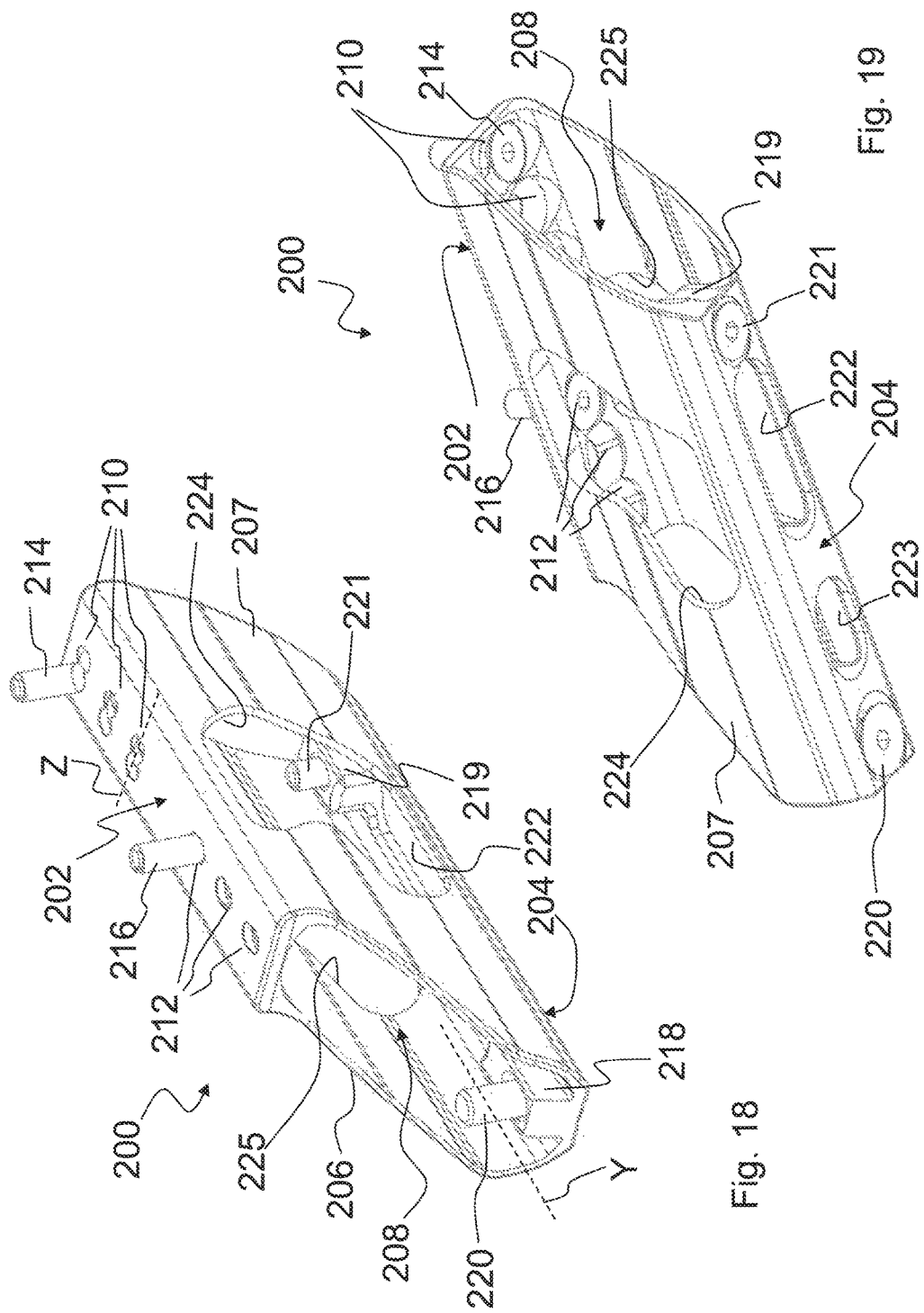

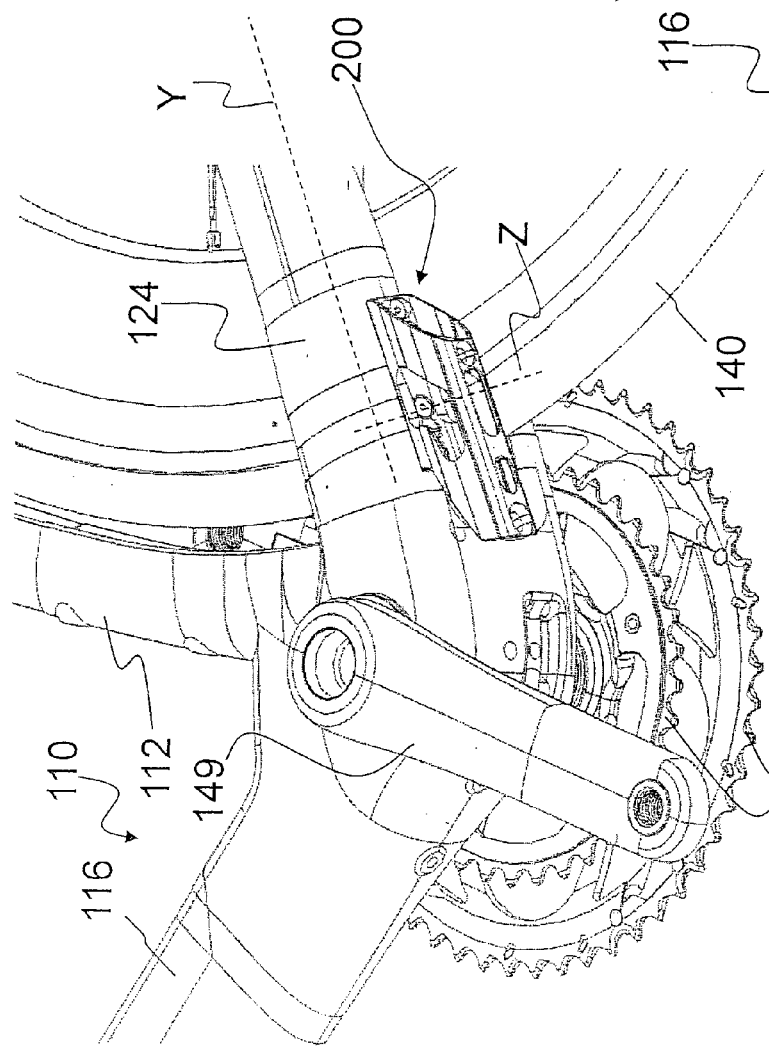
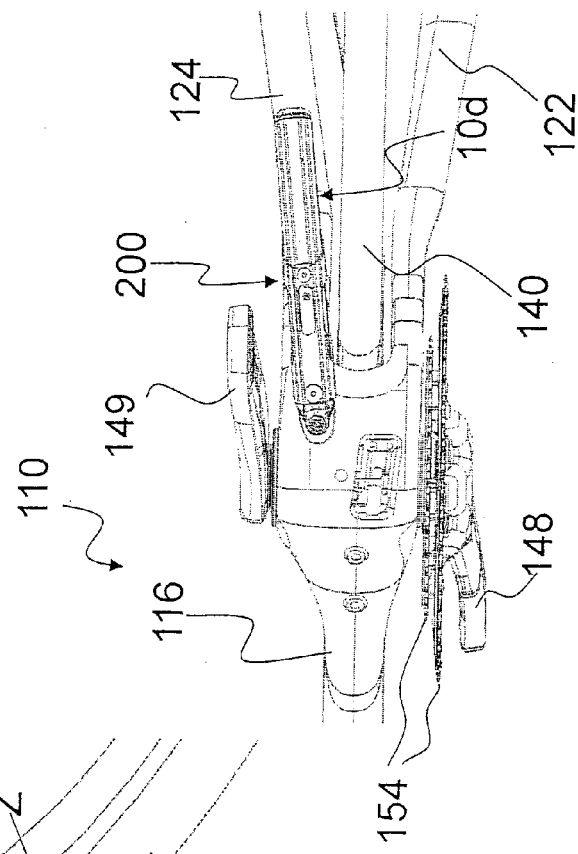

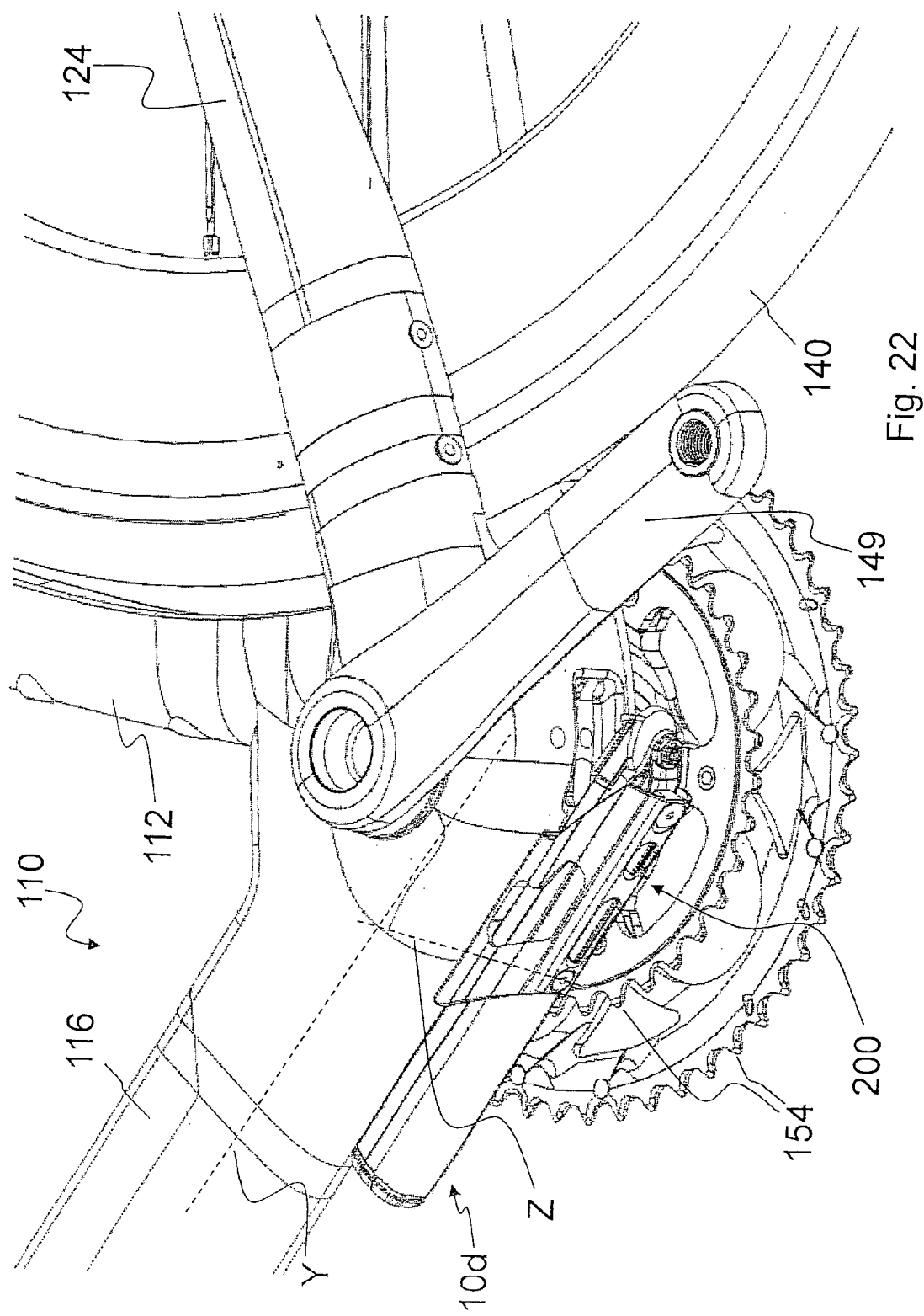

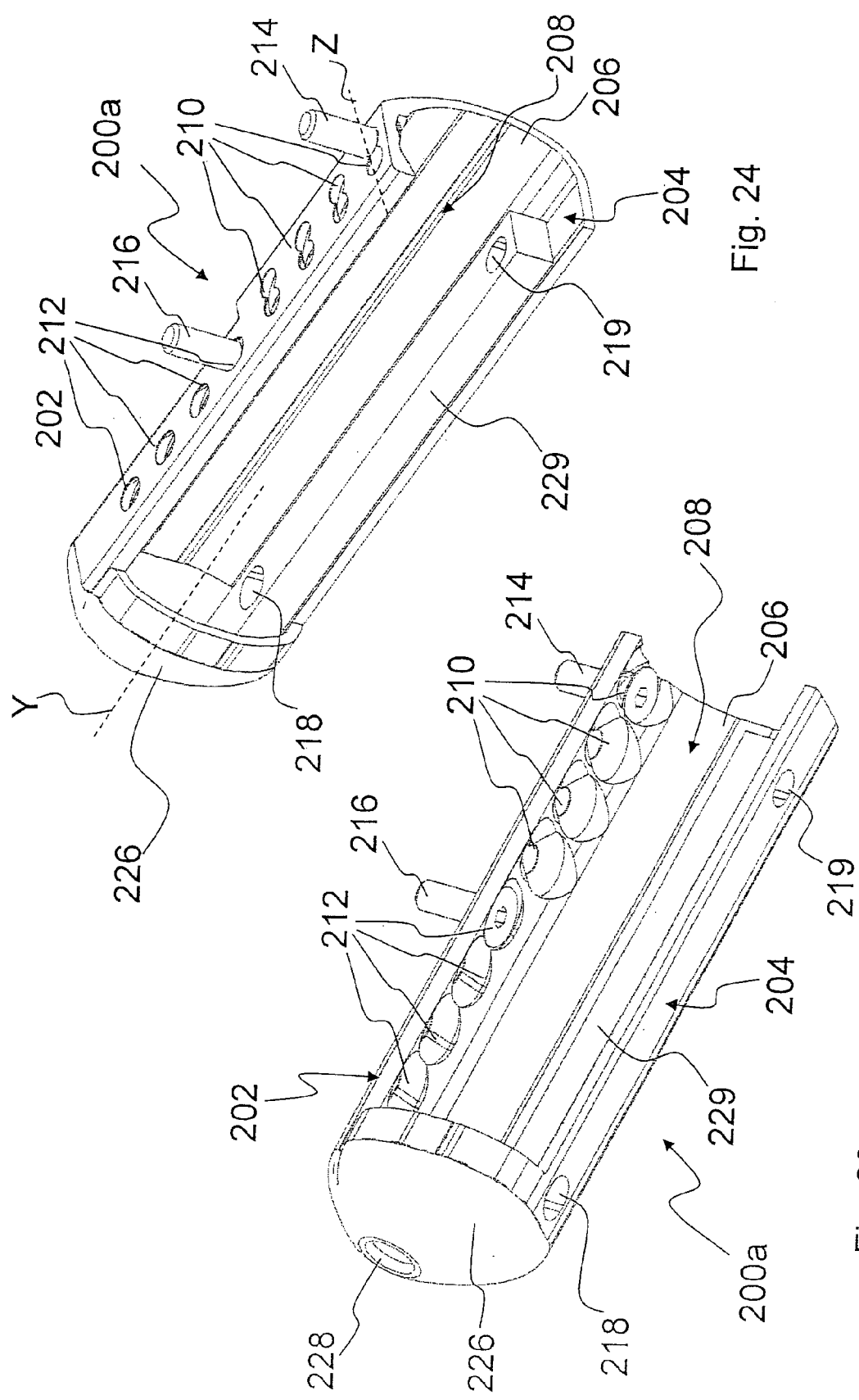

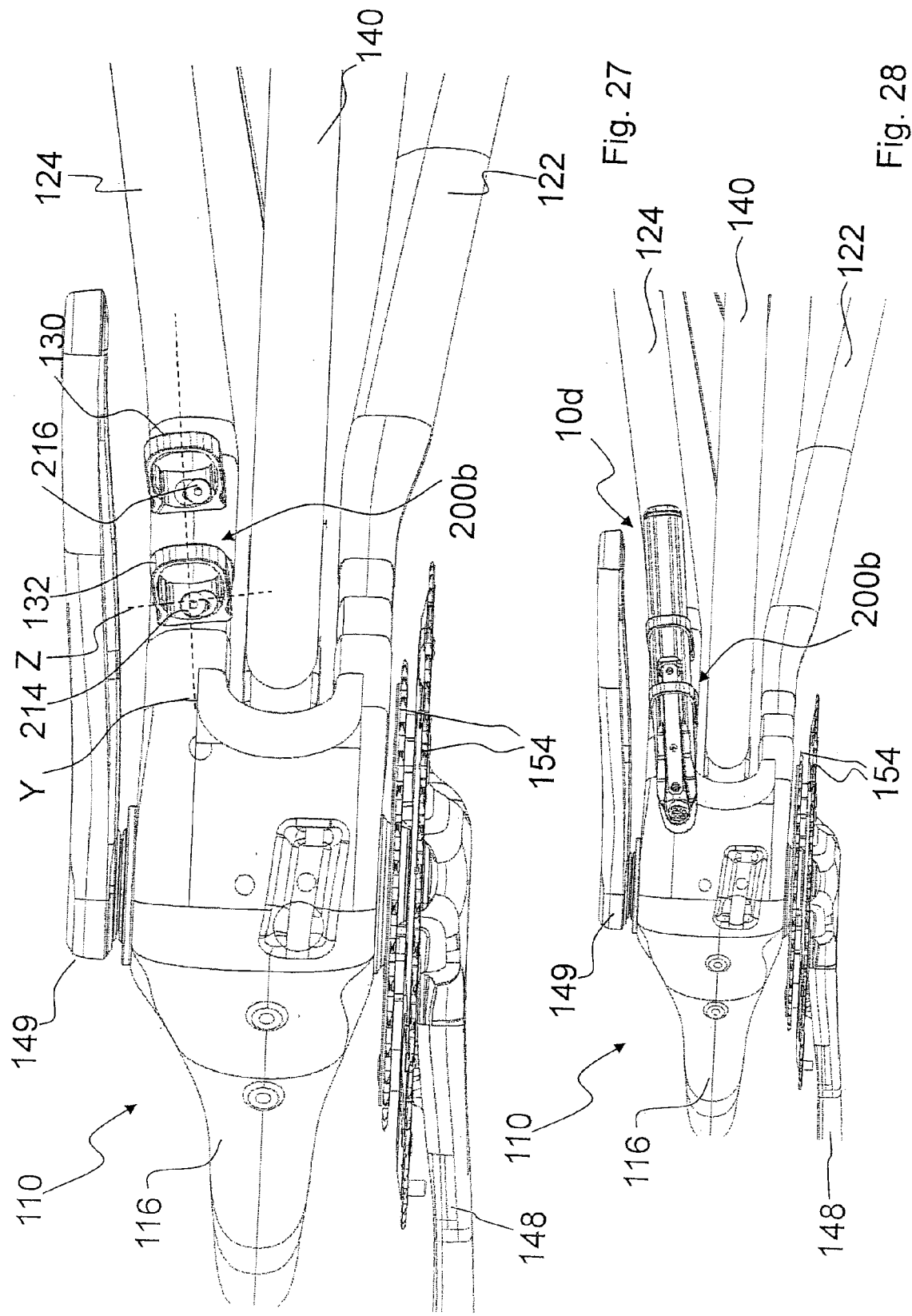

BICYCLE ON-BOARD DEVICE AND RELATED SUPPORT AND MOUNTING METHOD

FIELD OF INVENTION

The present invention concerns a bicycle on-board device, as well as a method and a support for mounting it.

Such a bicycle device can be of the stand-alone type or it can be part of an on-board electronic system comprising other cable connected or wireless electrical, electronic and/or electromechanical devices.

BACKGROUND

Bicycle on-board electronic systems are known and are becoming increasingly sophisticated. The on-board device or the system that it is part of can for example be intended for controlling and/or managing the gearshift and/or for acquiring, processing and/or storing parameters and/or data relative to the cyclist and/or to the bicycle and/or to the trip. The on-board device or the system that it is part of can also be intended for mobile telephone communication, for multimediality and/or for anti-theft surveillance of the bicycle.

The bicycle on-board device can also merely comprise a battery power supply unit, possibly with associated power supply electronics, for other devices of the on-board electronic system, or vice-versa just one or more circuit boards without a battery power supply unit.

US 2001/0042767 A1 and EP 1 553 012 A1 each describe a containment unit for an electronic system for controlling/powering at least one on-board electronic device for a bicycle, having a configuration suitable for fastening outside of the frame at the same attachment point as a bottle cage, and preferably with the same fastening means.

The Applicant observes that in such documents the position on the frame is uniquely defined and therefore is restricted to a specific model of bicycle frame.

US 2005/0280244 A1 describes a bicycle control apparatus that can be mounted in a seat post and more specifically in a seat post that is detachably mounted in the seat tube. According to such a document, the seat post, at its lower end opposite the saddle, comprises a circuit mounting structure like for example an internal threading. The control apparatus comprises a tubular housing, that can be inserted in the seat post, as well as a cover at the lower end of the tubular housing. The tubular housing houses a control unit in the form of a microprocessor, and it has an internal threading at the lower end. The cover is shaped like a stepped bolt comprising: a head, equipped with a tool engaging structure and having an outer diameter that is slightly smaller than the inner diameter of the seat post; a first male threaded portion having a diameter that is slightly smaller than the diameter of the head; and a second male threaded portion having a diameter that is slightly smaller than the diameter of the first male threaded portion. The second male threaded portion is screwed into the internal threading of the tubular housing; then the first male threaded portion is screwed into the internal threading of the seat post. In an alternative embodiment, the housing is mounted in the seat post in a different manner. The first male threaded portion of the cover is replaced by a mounting structure comprising a plurality of movable projections in the form of retaining balls slidingly retained in a corresponding plurality of retaining holes and biased radially outwardly by a corresponding plurality of springs. The mounting structure also includes a plurality of stationary projections in the form of rectangular male splines. In the seat post, the circuit mounting structure comprises, instead of the female threading, a plurality of recesses in the form of hemispherical grooves and a plurality of recesses in the form of female splines. This embodiment, with respect to the first, has the advantage of not subjecting the cables to twisting during assembly into the seat post.

Holes are provided in the tubular housing and in the cover, for the passage of cables for data and energy transport, equipped with respective connectors. Holes are similarly provided in the seat post, for the passage of cables, equipped with respective connectors. There can also be a groove in the inner peripheral surface of the seat post or in the outer peripheral surface of the housing, to house the cables that come out from the cover and lead them upwards, for example towards the top tube of the frame.

The Applicant observes that such a control apparatus has a series of drawbacks. Indeed, such an apparatus needs the seat post to have a tubular cylinder shape, while bicycle frames and therefore seat posts with a non-circular cross section are increasingly common, mainly for aerodynamic reasons; moreover, such an apparatus requires a substantial alteration of the seat post to make the circuit mounting structure, which moreover adapts poorly to seat posts made of a composite material such as carbon fibre. Moreover, it requires the disconnection of the signal and power cables whenever one wishes to remove the saddle. Furthermore, since it has to fit into the seat post that is in turn sized to fit in the seat tube of the frame, the apparatus necessarily has a small transversal size. Finally, bicycle frames with integrated seat post, for which such an apparatus is not suitable, are increasingly common.

The technical problem at the basis of the invention is to overcome the aforementioned drawbacks and allow an on-board device to be attached to a bicycle in a versatile manner, not restricted to a specific model of bicycle or frame.

SUMMARY OF PREFERRED EMBODIMENT

In one aspect, the invention concerns a support for removably fastening a bicycle on-board device having an oblong shape along a bicycle oblong element, characterised in that the support has at least a first opening configured to receive a shank of a first device for fastening to the oblong element, and a second opening configured to receive a shank of a second device for fastening to the oblong element, the first opening and the second opening being spaced apart a first direction, which in use is a longitudinal direction of the oblong element, the first opening being configured to receive the shank of the first device for fastening alternatively in at least two first positions spaced apart in said first opening, the two first positions being spaced along a second direction, substantially transversal to the first direction, which in use is a direction transversal to the oblong element.

The first direction is the longitudinal direction of a seat defined in the support for the on-board device and the second direction is a transversal direction of the seat defined in the support for the on-board device.

In this way, the support can be fixed, through the first and the second device for fastening, to a bicycle oblong element that is not rectilinear—as is typically the case of a horizontal tube of the rear stay that has a bend—adapting to different amounts of divergence from the rectilinear profile, typically dependent on the model of bicycle frame, extending as much as possible along such a frame element. By being able to mount the support so that it and the on-board device housed therein project as little as possible transversally from the frame, there are substantial advantages in terms of appearance, aerodynamics and safety.

Preferably, said at least one second opening is configured to receive the shank of the second fastening device alternatively in at least two second positions spaced apart in said second opening, the two second positions being preferably spaced along the first direction.

Preferably, said at least one first opening comprises a plurality of first openings spaced apart along the first direction.

Preferably, said at least one second opening comprises a plurality of second openings spaced apart along the first direction.

Preferably, each opening is independently selected from the group consisting of a slot defining numberless positions and a multi-hole opening, namely an opening having a shape corresponding to plural aligned circular holes preferably having a distance between centres that is smaller than the diameter, the multi-hole opening being preferred despite it being less simple since, in the case of loosening of the fastening element, it limits the vibrations.

Preferably, the support defines a seat for the on-board device configured to house the on-board device in at least two positions spaced apart in said seat, the two positions being spaced along a longitudinal axis of the on-board device. In this way, once the support is fixed to the bicycle oblong element, the on-board device can be made to slide along the bicycle oblong element in the support up to a suitable position. In particular, it is possible to fix the support to the frame at the bottom near to the housing box of the bottom bracket assembly, and make the on-board device slide into a position at least partially hidden by a pedal crank or by the toothed wheels.

In an embodiment the support defines an oblong seat for the on-board device having means projecting thereinto for fastening to the on-board device.

The projecting means is preferably a pair of perforated projecting seats that are sized, at least in the transversal direction of the device, similarly to a pair of inserts of the bicycle frame intended for fastening a bottle cage.

In this way, the oblong seat is configured like the inside of a seat tube of a bicycle frame at a bottle cage and it can be used with an on-board device that is advantageously configured to be fastened to the frame alternatively through the support or inside the seat tube, fastened through the fastening means of the bottle cage. Such a device is described in detail hereinafter.

As an alternative or in addition, the projecting means comprises at least one projecting rib for coupling with a groove of the on-board device.

In an embodiment, more specifically the oblong seat for the device is defined by a first wall having said at least one first and at least one second opening, a second wall at which there are said projecting means, and at least one joining wall between the first and the second wall, so that the support has the shape of at least part of the side or "shell" surface of a hollow solid.

In the present description and in the attached claims, the term "wall" should be broadly understood, to encompass substantially two-dimensional but not necessarily flat portion that does not necessarily end at edges and/or corners, like for example a portion of a cylindrical wall.

Preferably, the first and second walls are opposite one another and offset in the longitudinal direction of the support, so that the support has the shape of at least part of the shell surface of a hollow solid with oblique base and top with respect to the longitudinal axis. In this way it is possible to gain access to said at least one first opening, or, respectively to said at least one second opening, with a mounting tool for said first, respectively second fastening element, while still offering, in the longitudinal direction, a length suitable for containing and supporting the device. Such an embodiment is in particular useful in the case of fastening to the frame at the bottom, since it allows the support to be fixed to the frame easily despite the presence of pedal cranks and toothed wheels, while still then housing the device in close proximity to the bottom bracket assembly.

In an embodiment, the oblong seat for the device is open at both longitudinal ends. In the case in which fastening means like a screw is not used between the support and the on-board device, the latter can therefore slide along the bicycle oblong element.

In an alternative embodiment, the oblong seat for the device is open at a longitudinal end and closed by an end wall at the opposite longitudinal end.

Preferably, said end wall has a seat for a removable connector of a cable, more preferably of a power supply and/or recharging cable of the on-board device.

The support can be provided with one or more openings for gaining access to said at least one first opening and/or said at least one second opening and/or for lightening purposes.

In an embodiment the support comprises at least two straps, the first opening and the second opening being formed in distinct straps. By forming the two openings in distinct straps, it is possible to change the distance between the first and the second fastening devices to adapt it to the bicycle oblong element, by simply changing the distance between the straps.

Preferably, each strap has means for adjusting the clamping force around the on-board device, by loosening which it is possible to make the on-board device slide along the bicycle oblong element or remove it from the support.

Preferably, the support has at least one rubber insert on the surface of the seat intended for contact with the on-board device, having an anti-vibration function.

In another aspect thereof, the invention concerns an assembly of a support as stated above and bicycle on-board device configured for fastening in a seat of the support.

In another aspect thereof, the invention concerns a bicycle on-board device having an oblong shape and comprising a cavity, preferably containing a battery power supply unit and/or at least one circuit board inside it, the device being sized for insertion in a bicycle oblong element, characterised in that it has two seats for fastening devices, the seats being spaced apart along a longitudinal direction of the on-board device.

In this way the on-board device can be mounted inside the bicycle oblong element, in particular inserted in the oblong element, suspended in the oblong element or suspended from a tubular element able to be inserted in the oblong element, or else on the outside along the bicycle oblong element through two fastening devices, for example screws, passing transversally through the bicycle oblong element, or even through a support able to be fixed to the bicycle oblong element.

Preferably, said seats comprise two threaded holes.

Preferably, the on-board device further comprises a seat for a removable connector of a cable.

In another aspect thereof, the invention concerns an assembly of a bicycle on-board device as stated above and a support therefor.

Such an assembly offers the possibility of mounting the on-board device outside the bicycle directly or through the support and, without the support, in at least one position inside the bicycle, among inserted in a bicycle oblong element, suspended in a bicycle oblong element and suspended from a tubular element able to be inserted in a bicycle oblong element.

Preferably said at least one position inside the bicycle is selected from inserted in the seat tube, more preferably at the bottle cage, suspended in the seat tube and suspended from the seat post.

In another aspect thereof, the invention concerns a bicycle frame or seat post or handlebars with an on-board device mounted on an oblong element thereof, in particular a horizontal tube of the rear stay or the down tube of the frame, characterised in that the on-board device is housed in a support and it can be positioned with respect to the oblong element in at least two different positions along the longitudinal direction of the oblong element.

In another aspect thereof, the invention concerns a bicycle frame or seat post or handlebars with an on-board device mounted on an oblong element thereof, in particular a horizontal tube of the rear stay or the down tube of the frame, characterised in that the on-board device is housed in a support that can be positioned, with respect to the oblong element, with at least two different inclinations with respect to the longitudinal direction of the oblong element.

In another aspect thereof, the invention concerns a method for mounting a device on-board of a bicycle, comprising the steps of:

fixing a support to a bicycle oblong element through a first fastening device and a second fastening device by inserting a shank of the first fastening device in a first opening of the support and a shank of the second fastening device in a second opening of the support, wherein the shank of the first fastening device is inserted in the first opening in a preselected position of at least two first positions spaced apart in said first opening along a direction transversal to the frame element, and fastening the on-board device in a seat of the support.

In another aspect thereof, the invention concerns a support for a bicycle on-board device having a seat for a removable connector of a cable, more preferably of a recharging cable of the on-board device.

In another aspect thereof, the invention concerns a bicycle frame or a seat post or handlebars with a seat for mounting a removable connector of a cable, more preferably of a recharging cable of an on-board device able to be inserted in the frame or seat post or handlebars.

In another aspect thereof, the invention concerns a bicycle frame or a seat post or handlebars with an on-board device inserted in an oblong element thereof and a hole for gaining access to a removable connector of a cable of the on-board device, more preferably of a recharging cable.

In an aspect thereof, the invention concerns a bicycle on-board device having an oblong shape and comprising a cavity containing a battery power supply unit and at least one circuit board inside it, the device being sized for insertion into a seat tube of a bicycle frame, characterised by having at least one fastening means matching a bottle cage fastening means.

Typically, indeed, bicycle frames have an arrangement for fastening the bottle cage along the seat tube. The capability of insertion of the device inside the seat tube allows the connection cables to the other electrical, electronic and/or electromechanical devices of the on-board system not to be disconnected when the saddle is removed from the bicycle. Moreover, the bicycle on-board device is also suitable for bicycle frames with integrated seat post. Furthermore, since it is not necessary to hang the on-board device at the seat post, there is no need to arrange special fastening means in the seat post, ensuring immediate possibility of application essentially to all bicycle frames and seat posts of the countless manufacturers, even made of a composite material and/or with a non-circular cross section. The weight of the device is also arranged close to the lowermost point of the bicycle frame, with advantages in terms of stability.

In an embodiment, said at least one fastening means comprises one and preferably two holes having an internal threading matching the external threading of a respective screw for fastening the bottle cage. The threaded hole(s) is (are) arranged, in the mounted position of the on-board device, coaxial to a respective insert of the frame. Typically, indeed, bicycle frames comprise a pair of internally threaded inserts that, in order to allow suitable screwing length for fastening screws, project towards the inside of the frame.

Although the term "insert" is used hereinafter for the sake of simplicity, the invention applies to reinforcements in one piece with the frame.

In an embodiment, the internal threading of at least one of the holes is the same as the internal threading of the corresponding insert and it is preferably made in a component having at least one degree of freedom of movement with respect to the rest of the body of the device, so as to facilitate the engagement with the bottle cage fastening screw already screwed into the insert of the frame.

Preferably said component having said internal threading is a bush, housed in a smooth hole of the on-board device and longitudinally biased by a preloaded spring.

Alternatively, the threaded inserts of the frame can be replaced by inserts equipped with smooth holes for the passage of bottle cage fastening screws screwed in the on-board device only.

Furthermore, the internal threading of the on-board device and the associated fastening screw can have a diameter that is smaller than the inner diameter of the inserts of the frame, so that the bottle cage fastening screws are only screwed in the on-board device, after passing without engagement in the threaded inserts of the frame.

In such embodiments, the on-board device is preferably effectively fixed to the frame at the same time as the bottle cage. In case the bottle cage is to be fixed later or removed, it is suitable to unscrew a single screw, screw it also in the bottle cage or free it from the bottle cage, respectively, screw it back in the on-board device, and only thereafter similarly operate on the second screw.

In an embodiment that totally separates the two mounting steps of the on-board device and of the bottle cage, an externally and internally threaded element is screwed through its external threading into the insert of the frame and into the on-board device, the internal threading being available for fastening the bottle cage through a respective fastening screw.

In another embodiment that separates the two mounting steps of the on-board device and of the bottle cage, a stud bolt is screwed into the insert of the frame and into the on-board device, the bottle cage being fixed through a nut to the stud bolt.

In another embodiment, said at least one fastening means comprises a material in which the threading is created by a self-threading screw, and capable of holding it.

In an embodiment, the on-board device comprises a groove extending along its main longitudinal direction and sized to receive a portion of said at least one insert of the bicycle frame intended for fastening the bottle cage, said at least one fastening means being provided on the bottom of said groove.

The groove advantageously provides a constraint against rotation around, and inclination with respect to, a main longitudinal direction of the seat tube of the frame, therefore avoiding stresses and noise. Furthermore, by providing such a groove it is possible to maximize the size of the on-board device, and therefore the available internal space. Indeed, the on-board device can have elsewhere a transversal size essentially corresponding to the internal size of the seat tube of the frame, and in the longitudinal direction it can extend from the housing box of the bottom bracket assembly or slightly above, up to the depth of maximum insertion of the seat post.

Preferably, said groove extends from an end of the device that, in the mounted position of the device, is the lowermost, but it has an abutment surface at the upper longitudinal end of the groove. In this way, the on-board device hooks at the upper insert of the frame remaining suspended, ensuring that there is no interference with the shaft of the bottom bracket assembly.

In an embodiment, the device, at at least one longitudinal end, has alternative means for being fastened suspended at a seat post or at the seat tube.

In this way, the on-board device can be alternatively fixed hanging from the seat post, inserted in the seat post, hanging in the seat tube or inserted in the seat tube and fixed at the bottle cage as stated above.

The alternative fastening means can comprise an expander for fastening by radial pressure against the inner wall of the seat post or of the seat tube.

The expander can be made in a component that can be removably attached to the rest of the device through a joint, like for example a dovetail, bayonet, snap joint, etc. This embodiment allows an adjustment screw of the expander to be more easily reached.

Preferably, the device comprises an oblong hollow body made of a plastic material.

The groove and any fastening means and/or alternative fastening means can be made in a metal plate capable of being removably associated with the oblong hollow body, for example made of a plastic material. In this way, it is possible to increase the strength and/or make a single oblong hollow body and a series of plates, each adapted to different sizes and/or distances between centres of bottle cage fastening inserts.

Alternatively, at the expenses of the size of the internal cavity, it is possible to provide plural fastening means, for example plural pairs of holes, in different angular positions.

The on-board device can also be equipped with a seat for temporarily fastening a mounting aid means.

In an embodiment, said seat is a through hole extending substantially perpendicularly to the main longitudinal direction of the on-board device, even more preferably coinciding with the hole equipped with internal threading corresponding to the lower insert of the frame. In this embodiment, a first end of a semi-rigid cable, like a steel cable, is threaded into the hole of the lower insert of the frame, brought out from the upper end of the seat tube, passed into the through hole, re-threaded into the seat tube and brought out from the housing box of the bottom bracket assembly. By pulling the two ends of the cable away from the frame, the on-board device is positioned correctly, with the hole equipped with internal threading coaxial with the insert of the frame.

In another embodiment, said seat is made in the upper longitudinal end face and consists of a seat, for example a bayonet seat or an internally threaded hole, for temporarily fastening a rigid rod of length such as to still partially protrude from the seat tube when the on-board device is correctly positioned.

Preferably, the oblong hollow body defines a tight cavity.

Preferably, said at least one circuit board comprises a power supply circuit, a microprocessor and a memory.

Preferably, said battery power supply unit is cylindrical in shape.

Preferably, said at least one circuit board at least partially surrounds said battery power supply unit.

Preferably, the microprocessor is programmed for the management of at least one derailleur.

Preferably, the on-board device comprises a plurality of power supply, signal and/or data cables, more preferably equipped with respective end connectors for connection with at least one other on-board device in an on-board electronic system.

Preferably, each cable protrudes from a longitudinal end face of the on-board device.

Alternatively or additionally, the oblong hollow body of the on-board device can comprise at least one second groove extending substantially along its main longitudinal direction, for the passage of at least one cable between the on-board device and the bicycle frame.

As outlined above, the provision of a groove for housing the inserts of the frame provides a series of advantages. The Applicant has also recognized that such a groove can suffice to limit the movement of the on-board device within the seat tube, even in the absence of the screws or other means for fixing the bottle cage, possibly by providing for a slightly forced insertion of one or both of the inserts in the groove, and/or an expanded material around the on-board device.

In another aspect thereof, the invention therefore concerns a bicycle on-board device having an oblong shape and comprising a cavity preferably containing a battery power supply unit and at least one circuit board, the device being sized for insertion into a bicycle oblong element, preferably a seat tube of a bicycle frame, characterised by having a groove extending along its main longitudinal direction and sized to receive at least one protrusion projecting inside said oblong bicycle element, preferably a portion of at least one insert of a bicycle frame intended for fastening the bottle cage.

Preferably, the on-board device further comprises a seat for a removable connector of a cable.

Preferably, the groove extends from one end of the device and has an abutment surface at the opposite end of the groove.

Preferably, the on-board device further comprises two seats for fastening devices, said two seats being spaced apart along a longitudinal direction of the on-board device.

Preferably, the two seats comprise two threaded holes.

Preferably, the two seats are made on the bottom of said groove.

In another aspect thereof, the invention concerns an assembly of a bicycle on-board device as stated above and a support therefor.

In another aspect thereof, the invention concerns a method for mounting a device on-board of a bicycle, comprising the steps of inserting said device in a seat tube of a bicycle frame, and fastening said device to the frame through at least one fastening means matching a bottle cage fastening means.

Preferably, the method comprises the steps of positioning the device at at least one perforated insert of the bicycle frame intended for fastening the bottle cage, and fixing it through at least one bottle cage fastening screw extending through said at least one perforated insert.

In an embodiment, said step of positioning the device comprises the steps of: providing a through hole in the on-board device, extending substantially perpendicular to a main longitudinal direction of the on-board device, threading a first end of a semi-rigid cable in the hole of a lower insert of the bicycle frame, bringing said first end out from the upper end of the seat tube, passing said first end into the through hole, re-threading said first end in the seat tube, bringing said first end out from the housing box of the bottom bracket assembly, and pulling the two ends of the cable away from the frame.

In an embodiment, said step of positioning the device comprises the step of temporarily fastening a rigid rod to an upper end of the on-board device, of a length such as to still partially protrude from the seat tube when the on-board device is correctly positioned.

BRIEF DESCRIPTION OF THE DRAWINGS

Further features and advantages of the invention will become clearer from the description of some preferred embodiments thereof, made with reference to the attached drawings, wherein:

FIGS. 18 and 19 show two different perspective views of a first embodiment of a support for mounting a bicycle on-board device externally on the frame;

FIG. 20 shows the support of FIGS. 18-19 mounted on a horizontal tube of the rear stay;

FIG. 21 shows the support of FIGS. 18-19 mounted on a horizontal tube of the rear stay, with the on-board device inserted;

FIG. 22 shows the support of FIGS. 18-19 mounted on the down tube;

FIGS. 23 and 24 show two different perspective views of a second embodiment of a support for mounting a bicycle on-board device externally on the frame;

FIG. 27 shows the support of FIG. 26 mounted on a horizontal tube of the rear stay;

FIG. 28 shows the support of FIG. 26 mounted on a horizontal tube of the rear stay, with the on-board device inserted.

DETAILED DESCRIPTION OF THE PREFERRED EMBODIMENTS

Figure 1:
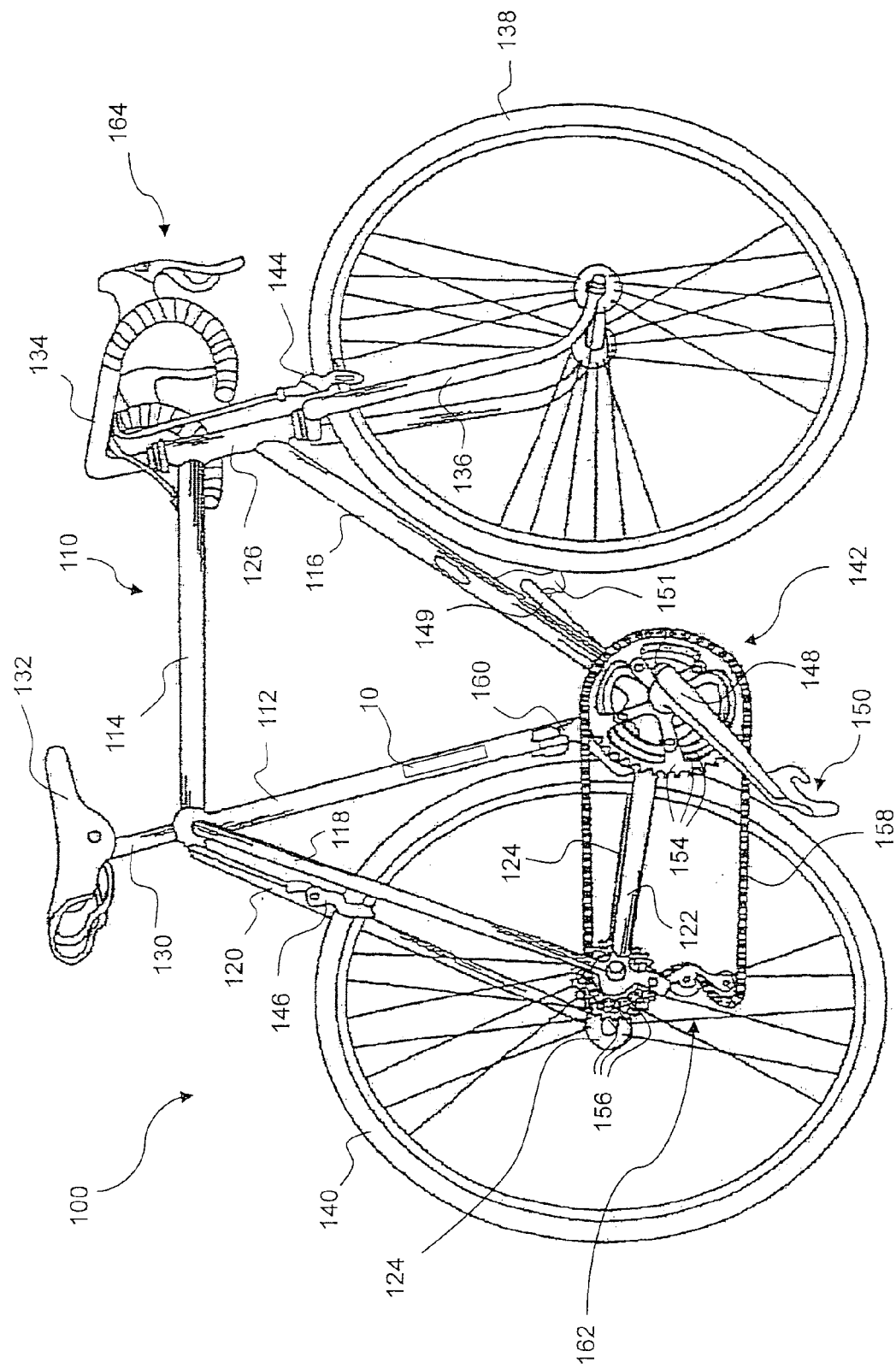
FIG. 1 schematically illustrates a bicycle having an on-board device according to some embodiments of the invention mounted thereto.
Figure 2:
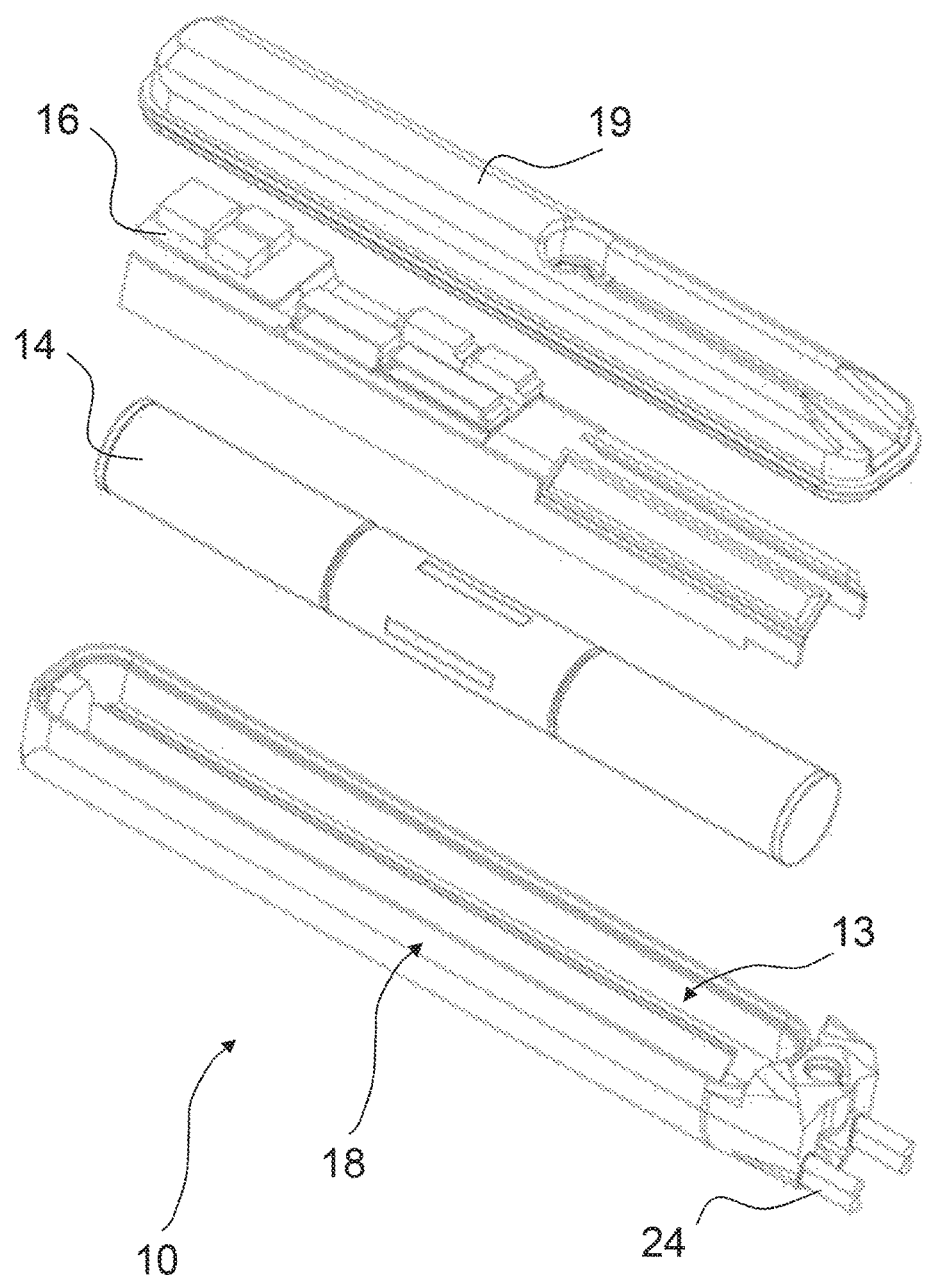
FIG. 2 is an exploded view of an embodiment of an on-board device according to the invention.
Figure 3:
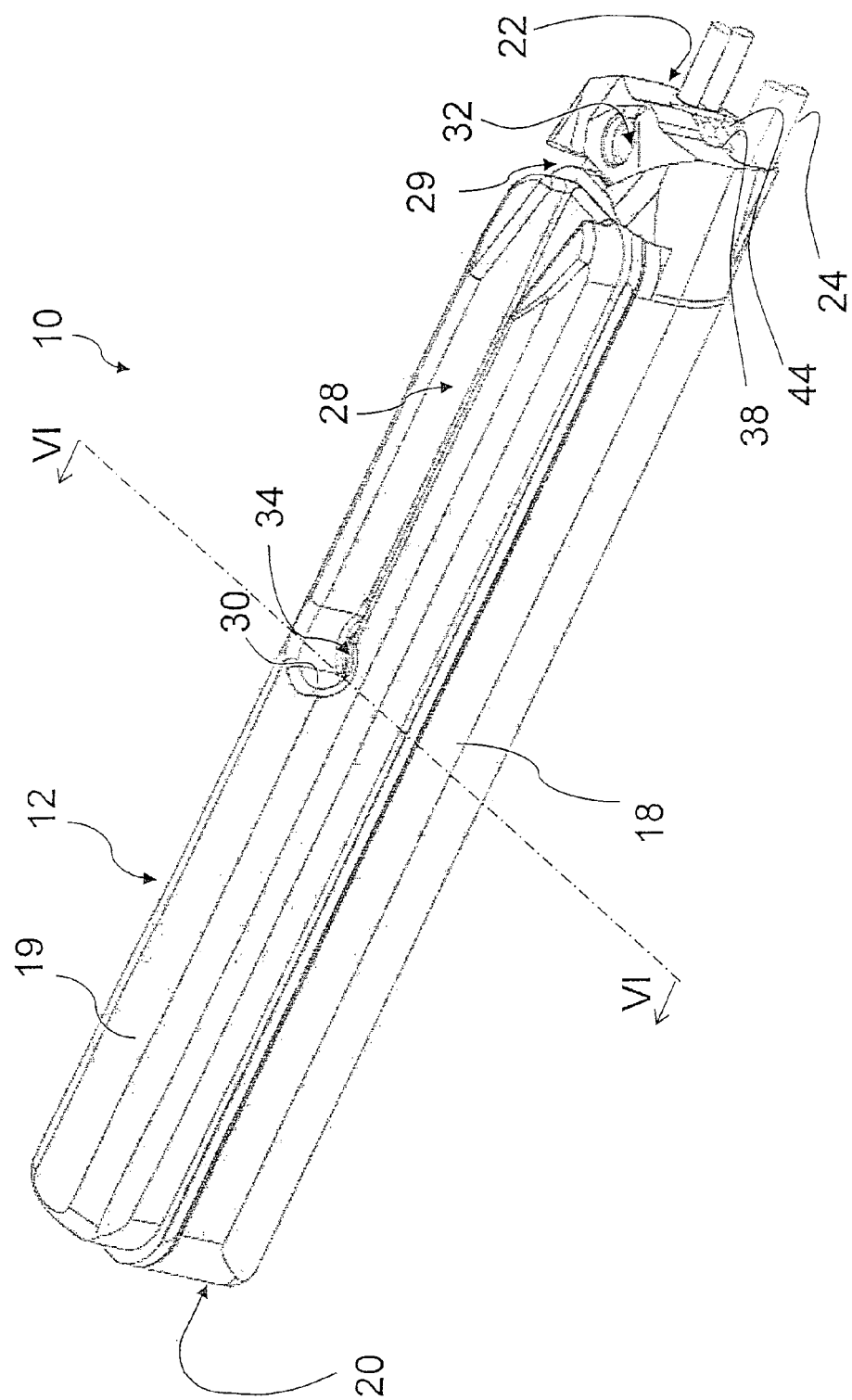
FIG. 3 is a perspective view of the on-board device of FIG. 2.

FIG. 1 schematically illustrates an example bicycle 100, having an on-board device 10 according to some embodiments of the invention mounted thereto.

In a per se known way, the bicycle 100 comprises a frame 110, a seat post 130 at least partially inserted in the upper end of a seat tube 112 of the frame 110 and equipped with a saddle 132 at its upper end, handlebars 134, a fork 136 rotatably mounted in a head tube 126, a front wheel 138 rotatably supported at the lower end of the fork 136, a rear wheel 140 rotatably supported at the rear part of the frame 110, a propulsion mechanism 142 and at least one of a front brake 144 and a rear brake 146.

Figure 8:
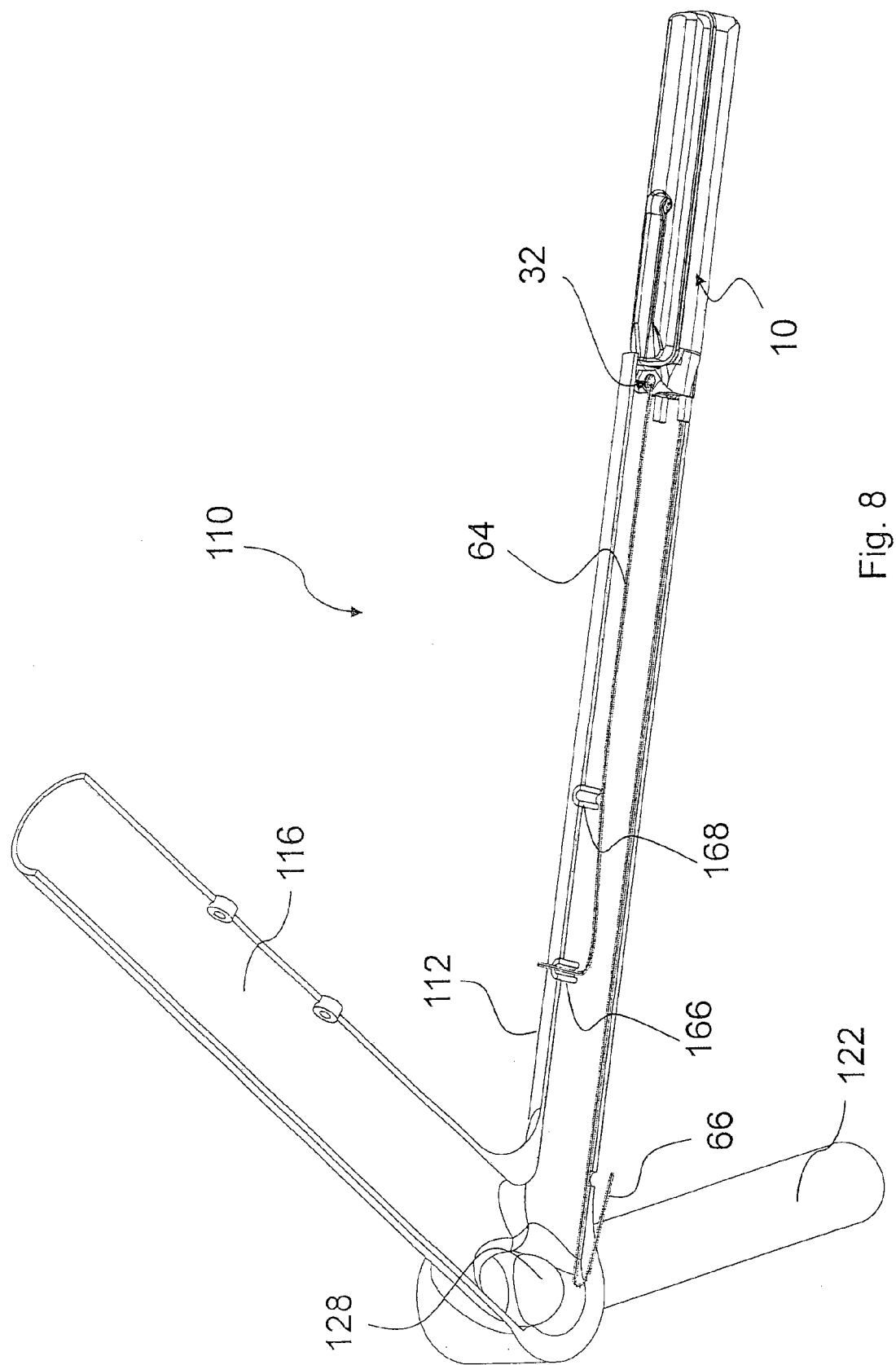
FIG. 8 is a perspective view of the on-board device of FIG. 2, in a mounting step, wherein the bicycle frame is shown partially in section.

The frame 110 in the embodiment shown is of the diamond type, comprising the aforementioned seat tube 112, the aforementioned head tube 126, a top tube 114, a down tube 116, and four more tubes of the rear stays 118, 120, 122, 124 as well as a housing box of the bottom bracket assembly 128 (FIG. 8). The rear stays 116, 118, 120, 122, 124 more specifically comprise the down tube 116, a pair of seat tubes 118, 120 that extend obliquely downwards and backwards from the point in which the seat tube 112 and the top tube 114 meet and the seat post 130 is mounted, and a pair of tubes 122, 124 that extend substantially horizontally backwards from the point at which the seat post 112 and the down tube 116 meet and there is the housing box of the bottom bracket assembly 128, one of which 122 is also called sheath in the field.

The frame 110 can however have other shapes, and in particular it can have an integrated seat post, so that the seat post 130 is absent.

Typically, the propulsion mechanism 142 comprises a pair of crank arms 148, 149 equipped with pedals 150, 151 to drive a shaft of the bottom bracket assembly (not shown)

into rotation, rotatably supported in the housing box of the bottom bracket assembly 128 and on which at least one front sprocket 154 is fitted; at least one rear toothed wheel 156 at the rear wheel 140 and a chain 158 extending each time between a front toothed wheel 154 and a rear toothed wheel 156. In the case of a propulsion mechanism 142 with variable transmission ratio, there is also a front derailleur 160 to move the chain 158 among the front toothed wheels 154 and/or a rear derailleur 162 to move the chain 158 among the rear toothed wheels 156.

Devices 164 for controlling the brakes 144, 146 and/or the derailleurs 160, 162 are typically arranged at the ends of the handlebars 134 as shown, or they are fixed in a convenient position on the frame 110. Such devices can comprise levers and/or buttons to generate electrical actuation commands of the brakes 144, 146 and/or of the derailleurs 160, 162, or to actuate them mechanically, like for example through a Bowden cable.

An on-board electronic system mounted on the bicycle 100 comprises one or more of the following devices or components (many of which are not shown): the aforementioned control devices 164, an electric motor for moving each derailleur 160, 162, a position sensor of each derailleur 160, 162, a speed sensor, a pedalling cadence sensor, an inclinometer, a speedometer, a heart rate monitor or other sensors, a display unit, an audio unit, as well as at least one battery power supply unit preferably of the rechargeable type, one or more processors, and memory means for the operation of such devices and/or for collecting and storing data. There can also be a reader of multimedia content such as music, video, images, including geographical map files, a digital camera, a video camera, a voice recording unit, a mobile telephone unit and/or other applications.

The various components described above are cable and/or wireless connected to each other, and they can be placed in various places of the bicycle.

An embodiment of an on-board device 10 according to the invention, which can constitute or be a component of such an on-board electronic system, is shown schematically in FIG. 1 in its condition mounted into the seat tube 112, and in detail in FIGS. 2 to 8.

The on-board device 10 comprises an oblong hollow body 12, defining an internal cavity 13 in which a battery power supply unit 14 and at least one circuit board 16 are housed.

In the embodiment shown, the circuit board 16 is a so-called power board, namely containing the electronics for controlling the derailleurs 160, 162 and for detecting the position thereof. In this embodiment, the on-board device 10 is connected with the derailleurs 160, 162 and with the manual control devices 164, for example through cables 24. The circuit board 16 can comprise a power supply circuit that receives power from the battery power supply unit 14 and outputs it to other components of the on-board device 10 and/or of the on-board system, a recharging circuit that receives electrical power from an external source such as the mains or a dynamo and outputs it to the battery power supply unit 14, a circuit for managing the derailleurs 160, 162, and a circuit for managing the various sensors.

Electronics for managing the transmission ratios, in a automatic mode or based on manual controls entered for example through the manual control devices 164 or in a semi-automatic mode, also based on signals coming from the possible sensors, is housed in the on-board device 10 and/or in the manual control devices 164.

The oblong hollow body 12 is made, for example, of a plastic material and is configured and sized for being housed inside the seat tube 112. The oblong hollow body 12 has a base 18 and a cover 19 that define a side surface, an upper longitudinal end 20 and a lower longitudinal end 22, the adjectives upper and lower being used, in order to make the invention easier to understand, with reference to the mounted condition of the device 10 shown in FIG. 7. In other mounting conditions, the device 10 could be mounted upside down or essentially horizontal.

A plurality of power supply, signal and/or data cables 24 extend from the circuit board 16 and come out from the oblong hollow body 12 at its lower longitudinal end face 22 as shown and/or at its upper longitudinal end face 20.

The cables 24 are preferably equipped with respective removable connectors (cfr. the removable connector 86 of FIG. 15) for connection with other devices of the electronic system and/or with a power supply source for recharging the battery power supply unit 14.

Figure 5:
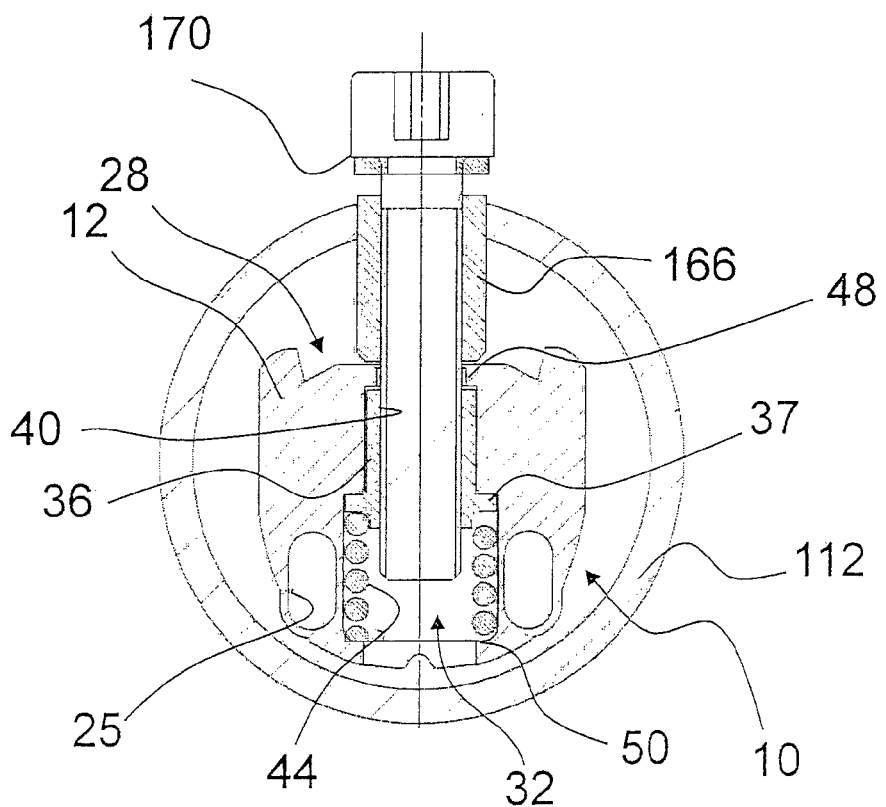
FIG. 5 is a cross sectional view of the on-board device of FIG. 2 in the mounted condition, taken along the section plane V-V of FIG. 7.
Figure 6:
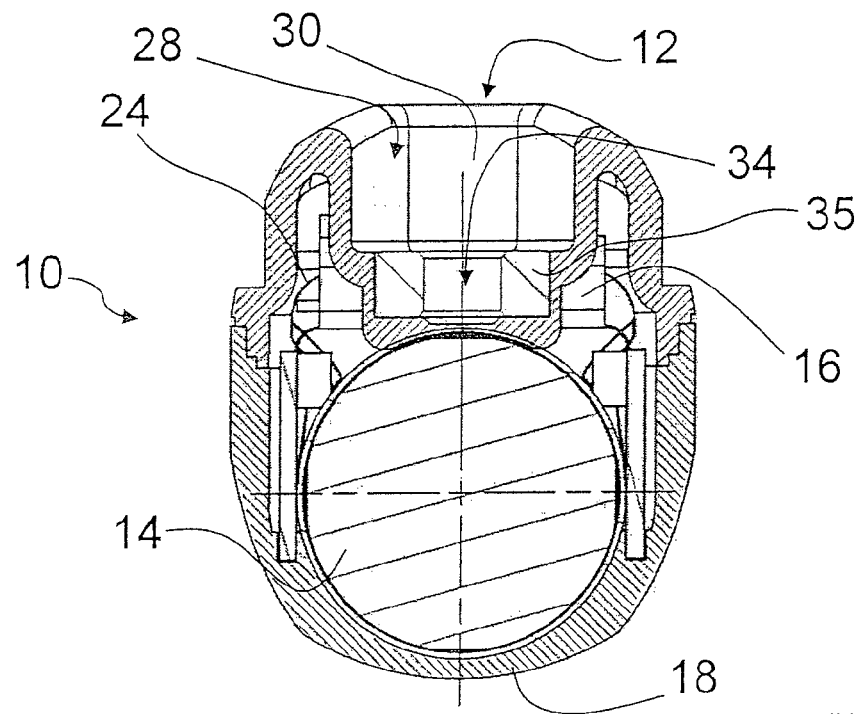
FIG. 6 is a cross sectional view of the on-board device of FIG. 2, taken along the section plane VI-VI of FIG. 3.

The oblong hollow body 12 is advantageously tightly closed. For example, the cover 19 is ultrasound welded, glued or screwed with interposition of a gasket to the base 18. Insulating material can also be provided at the exit of the cables 24 through suitable holes 25 (FIG. 5).

The oblong hollow body 12 has a groove 28 extending parallel to its main longitudinal direction X, hereinafter called axis X for the sake of brevity. The groove 28 extends from the lower end 22.

The groove 28 is preferably flared and/or tapered towards the lower end 22.

In the embodiment shown, the groove is made in part in the cover 19 and in part in the base 18 of the oblong hollow body 12, and thus it has a short interruption 29.

In the embodiment shown, the groove 28 does not extend up to the upper end 20, rather on the contrary it has an abutment surface 30 extending substantially transversal to axis X.

The groove 28 is sized to receive a portion of two inserts 166, 168 (FIG. 5, 7, 8) that are arranged, in a substantially standardized manner, in the seat tube 112 for fastening a bottle cage and that project towards the inside of the seat tube 112.

Alternatively, the groove 28 could receive the upper insert 168 only.

Thanks to the described groove 28, the transversal size of the oblong hollow body 12 can correspond elsewhere—and in particular in its upper portion—essentially to the internal transversal size, in particular to the internal diameter, of the seat tube 112 and/or the longitudinal size of the device 10 can be maximized.

The oblong hollow body 12, slid in the seat tube 112 with the groove 28 in the suitable angular position (about the axis X), thus "hooks" onto the inserts 166, 168, remaining possibly suspended slightly above the housing box of the bottom bracket assembly 128.

In any case, the seating of the inserts 166, 168 in the groove 28, especially if the groove is not oversized or even is slightly undersized so that the seating of the inserts 166, 168 is forced, prevents the rotation of the device 10 about the axis X and also oscillating inclination movements with respect to the axis X.

Figure 17:
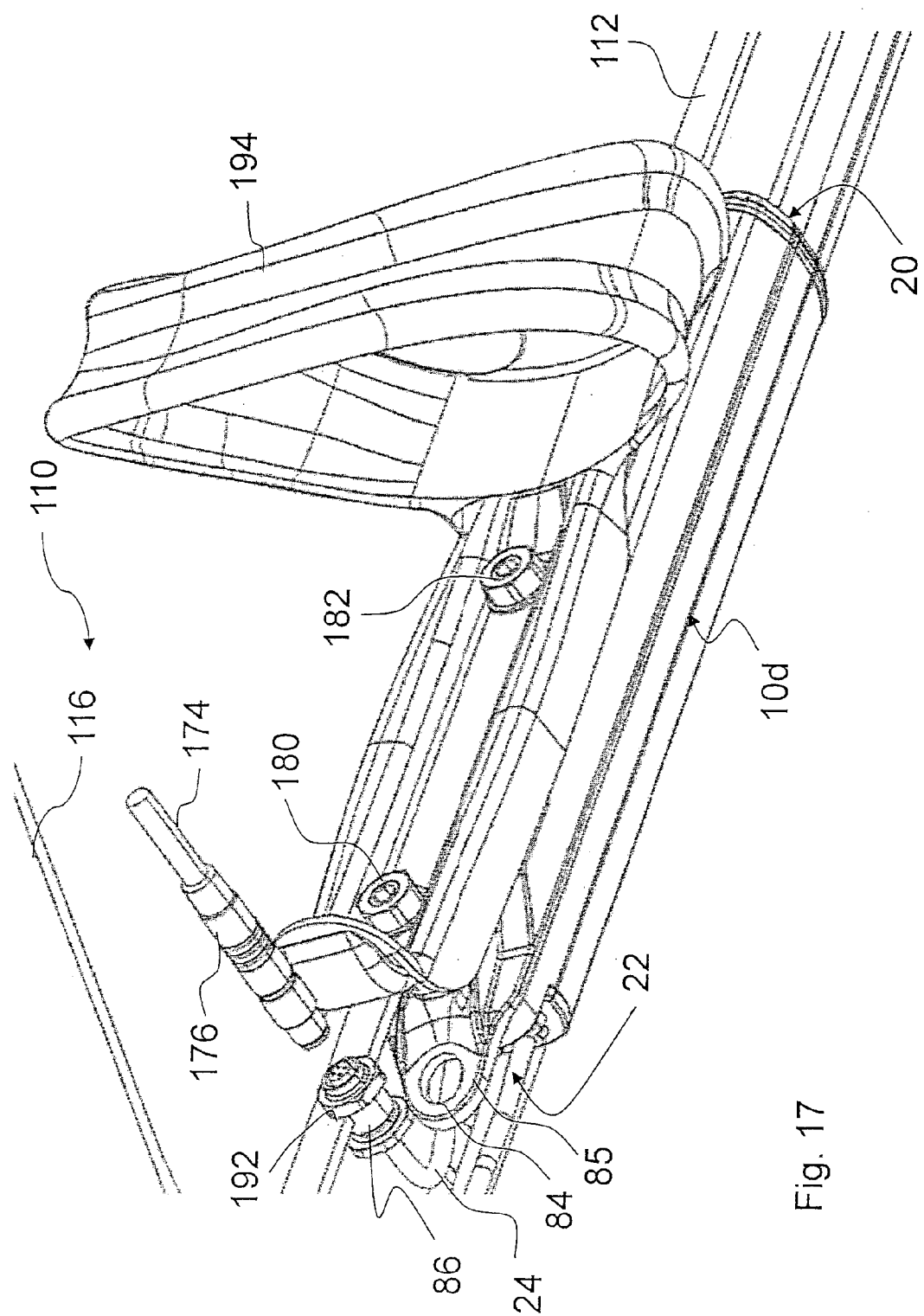
FIG. 17 is a perspective view of the on-board device of FIG. 15, in the mounted condition, wherein the seat tube of the bicycle is shown in section and in another mounted condition of a connector.

In order to further avoid the movement of the device 10 inside the seat tube 112, on the bottom of the groove 28, in the embodiment shown there are two holes 32, 34 equipped with an internal threading matching the external threading of two screws 170,172 (FIG. 7) for fastening a bottle cage (cfr. the bottle cage 194 of FIG. 17).

In the embodiment shown, the internal threading of the holes 32, 34 is the same as that of the inserts 166, 168. In order to facilitate the engagement of the screw 170 with the internal threading of the hole 32 despite it being already partially screwed into the insert 166, in the embodiment shown the internally threaded hole 32 on the side of the lower end 22 is made in a bush 36 that is housed with clearance in a smooth hole 40 of the oblong hollow body 12, as can be seen more clearly in FIGS. 4, 5. The bush 36 is longitudinally biased, for example by a coil spring 44 acting on a flange 37 of the bush 36, and bush 36 and spring 44 are longitudinally held by abutment surfaces 48, 50. Bush 36 and spring 44 are inserted in the smooth hole 40 through an opening 38 of the oblong body 12.

The internally threaded hole 34 on the upper end side 20 could be made similarly, but in the embodiment shown it is instead made in a conventional nut 35.

Figure 4:
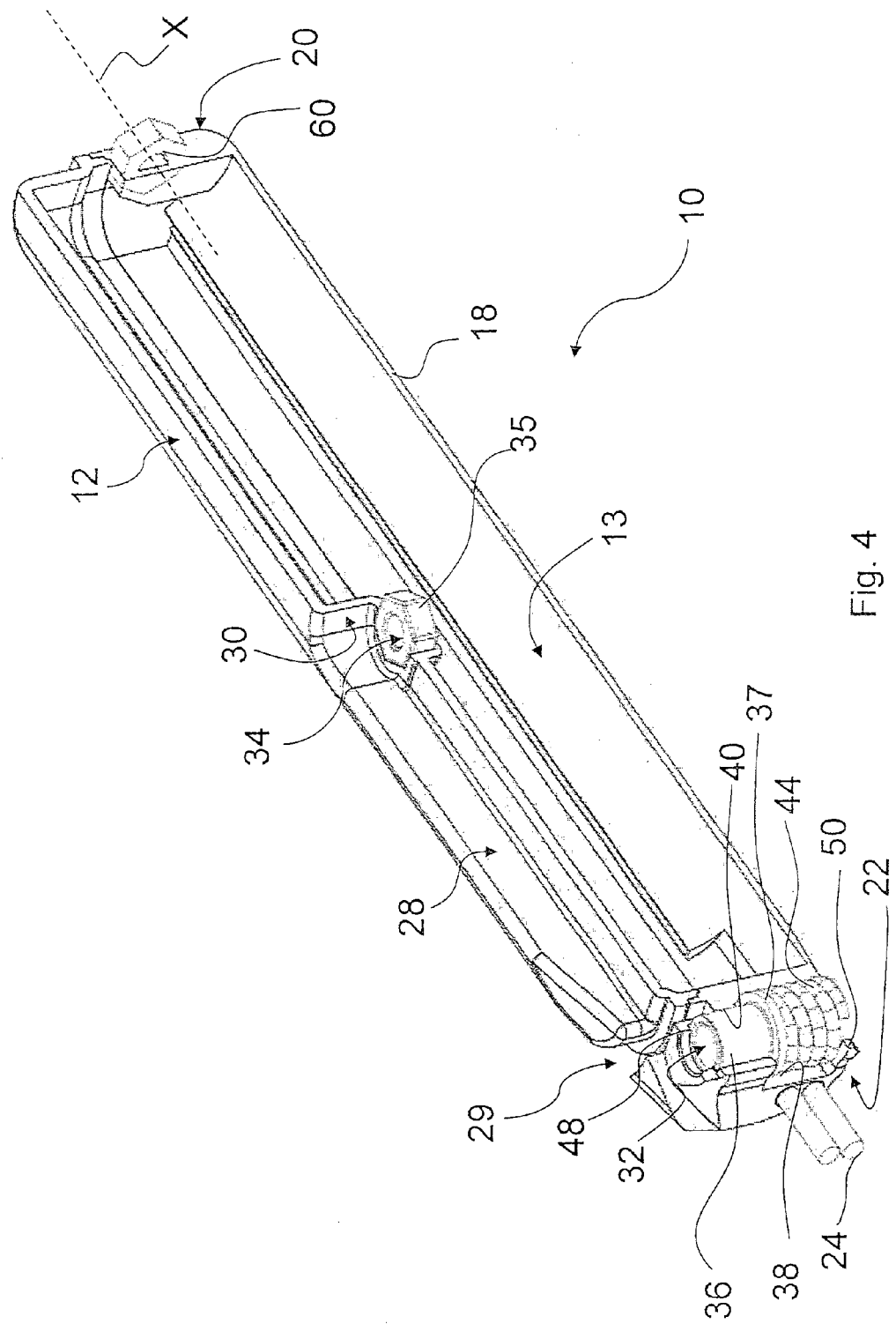
FIG. 4 is a perspective view, partially in longitudinal section, of the on-board device of FIG. 2.
Figure 7:
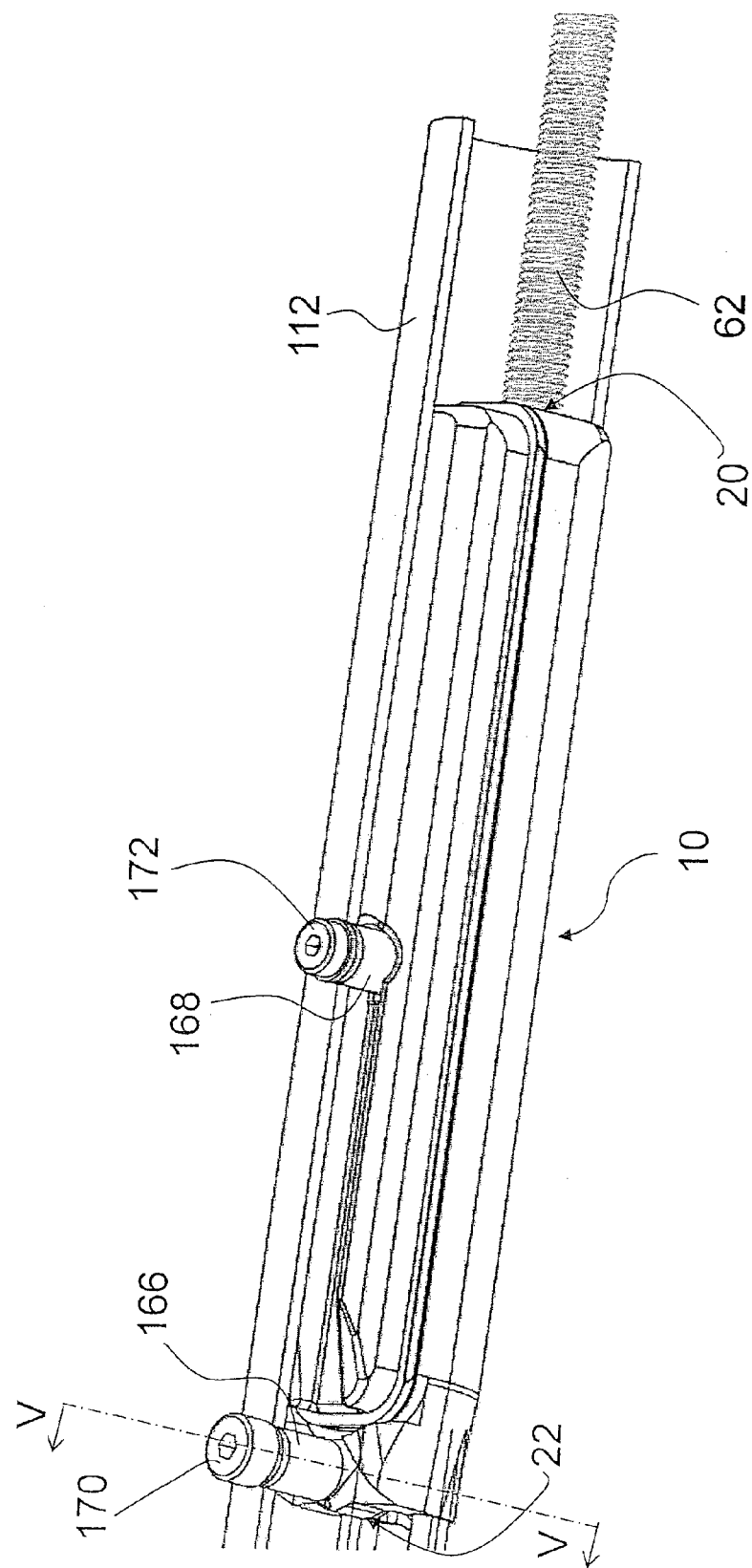
FIG. 7 is a perspective view of the on-board device of FIG. 2, in the mounted condition, wherein the seat tube of the bicycle is shown in section.

As shown with reference to FIGS. 4 and 7, in an embodiment, in the face of the upper longitudinal end 20 of the device 10 there can be an internally threaded hole 60 or a bayonet seat or another seat for temporarily fastening a rigid rod 62, of a length such as to still partially protrude from the seat tube 112 when the on-board device 10 is correctly positioned at the bottle cage, so as to allow the on-board device 10 to be manoeuvred to position it correctly. Once the on-board device 10 has been correctly inserted, and after having possibly fixed it with the screws 170, 172 for fastening the bottle cage, the rod 62 is removed from the seat 60 and withdrawn from the seat tube 112.

Alternatively or additionally, as shown in FIG. 8, the hole 32, if it is a through hole as shown, can act as a seat for the temporary passage of a semi-rigid cable 64 as a mounting aid. As an alternative to using the hole 32, there can be a special through hole extending in the on-board device 10 substantially perpendicular to the axis X (cfr. reference numeral 84 in FIG. 15). A first end 66 of the semi-rigid cable 64, for example a steel cable, is threaded in the hole of the lower insert 166 of the frame 110, brought out from the upper end of the seat tube 112, passed into the through hole 32 or into the special seat, re-threaded into the seat tube 112 and brought out from the housing box of the bottom bracket assembly 128. By pulling the two ends of the cable 64 away from the frame 110, the on-board device 10 is positioned correctly, with the hole 32 equipped with internal threading coaxial to the insert 166 of the frame.

Figure 9:
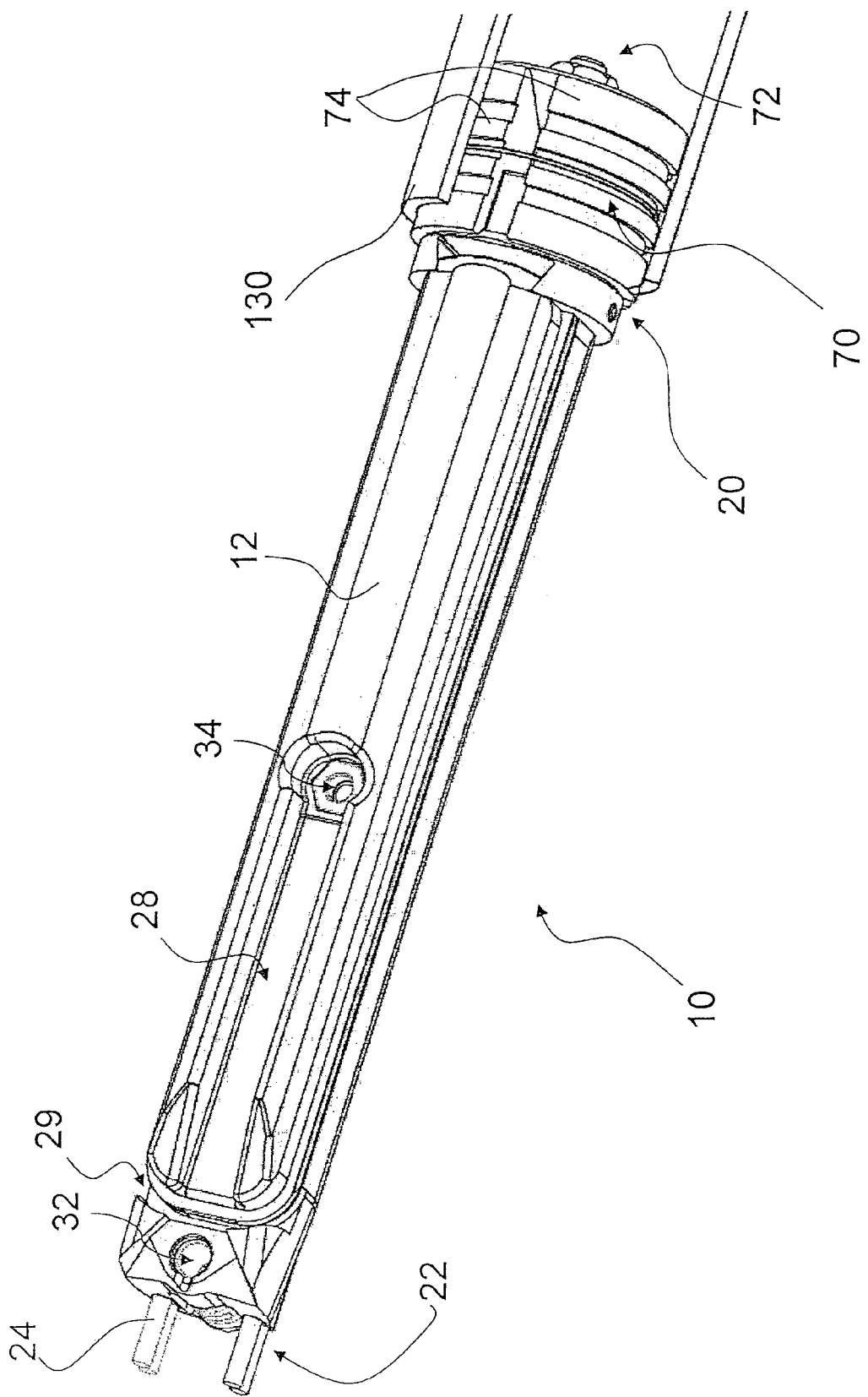
FIG. 9 is a perspective view of the on-board device of FIG. 2, in an alternative mounting condition, wherein the seat post of the bicycle is shown in longitudinal section.
Figure 10:
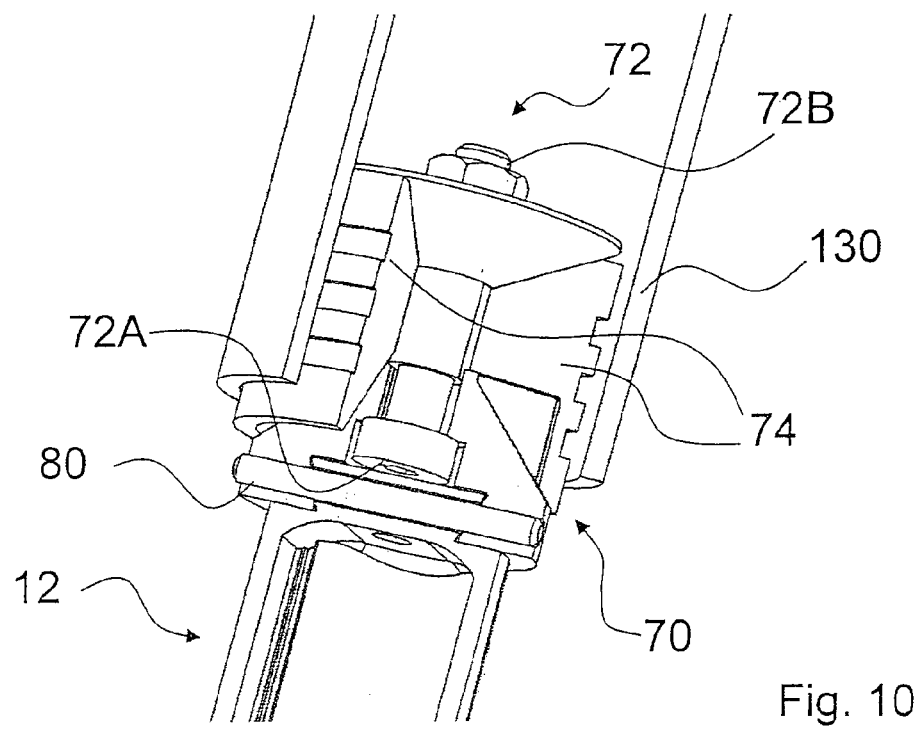
FIG. 10 is a perspective view partially in section of a detail of FIG. 9.
Figure 11:
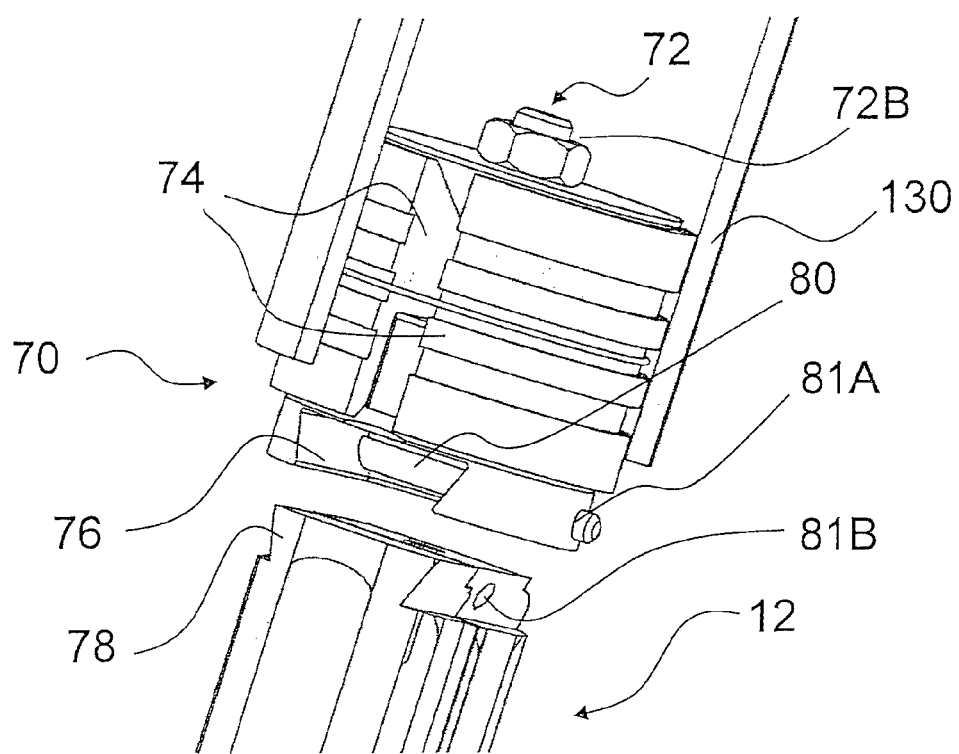
FIG. 11 is a perspective view partially in section of a detail of FIG. 9, in a mounting step.

In the embodiment shown in FIGS. 9, 10, 11, the oblong hollow body 12, at the upper longitudinal end 20, has alternative means for being fastened hanging at the seat post 130 (as shown) or at the seat tube 112.

The alternative fastening means shown comprises an expander 70, per se known, for locking by radial pressure against the inner wall of the seat post 130 (as shown) or of the seat tube 112. The expander 70 is a substantially cylindrical body having an adjustment bolt 72 extending in the axial direction and a plurality of elements 74, the radial extension of which is adjustable through the adjustment bolt 72. Preferably, both of the ends 72A, 72B of the adjustment bolt 72 are accessible and manoeuvrable.

The expander 70 is shown as a separate component from the oblong hollow body 12, the two being able to be connected together through matching jointing means, preferably of the dovetail type 76, 78. A pin coupling is also provided to prevent the mutual rotary movement about the axis X between expander 70 and oblong hollow body 12, and to make the coupling between the two pieces more secure.

For mounting suspended outside of the seat post 130, the expander 70 is initially inserted in the seat post 130 (FIG. 11) and the bolt 72 is actuated from the end 72A to lock the expander 70 on the inner surface of the seat post 130; thereafter, the oblong hollow body 12 is fastened to the expander 70 through the dovetail means 76, 78, and preferably fixed by inserting the pin 80 in coaxial holes 81A and 81B, extending transversally in the expander 70 and in the oblong hollow body 12, respectively.

For mounting suspended at the seat tube 112 or inserted in the seat post 130, the oblong hollow body 12 is firstly fastened to the expander 70 through the dovetail means 76, 78 and preferably through the pin coupling; thereafter, the assembly of the two is inserted in the seat tube 112 or in the seat post 130 and the bolt 72 is actuated from the end 72B to lock the expander 70 on the inner surface of the seat tube 112 or of the seat post 130.

Figure 12:
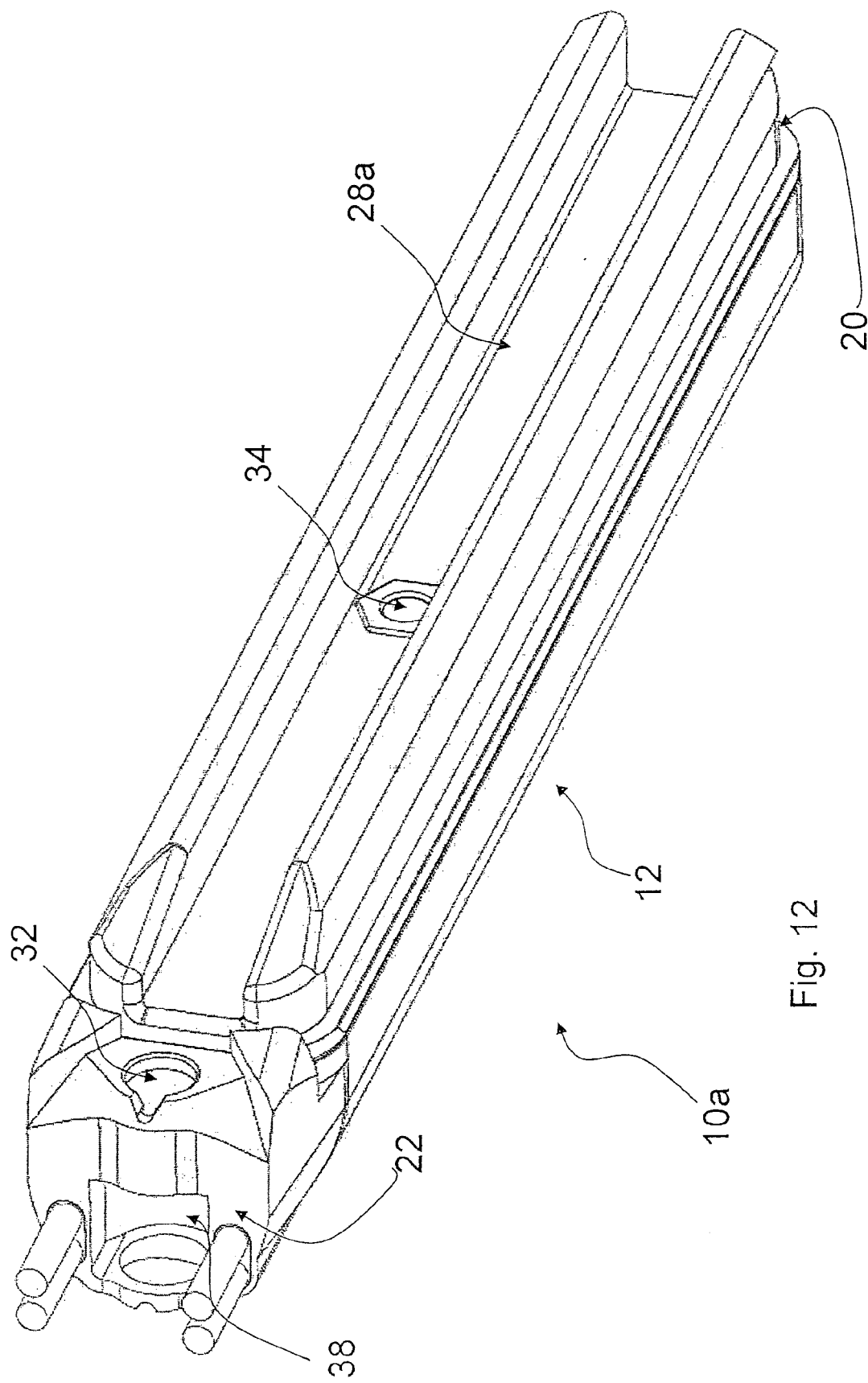
FIG. 12 is a perspective view of another embodiment of an on-board device according to the invention.

FIG. 12 illustrates an embodiment of the device 10a that differs from the one illustrated and described above in that the groove 28a extends for the entire length of the oblong body 12, with the abutment surface 30 being absent.

Figure 13:
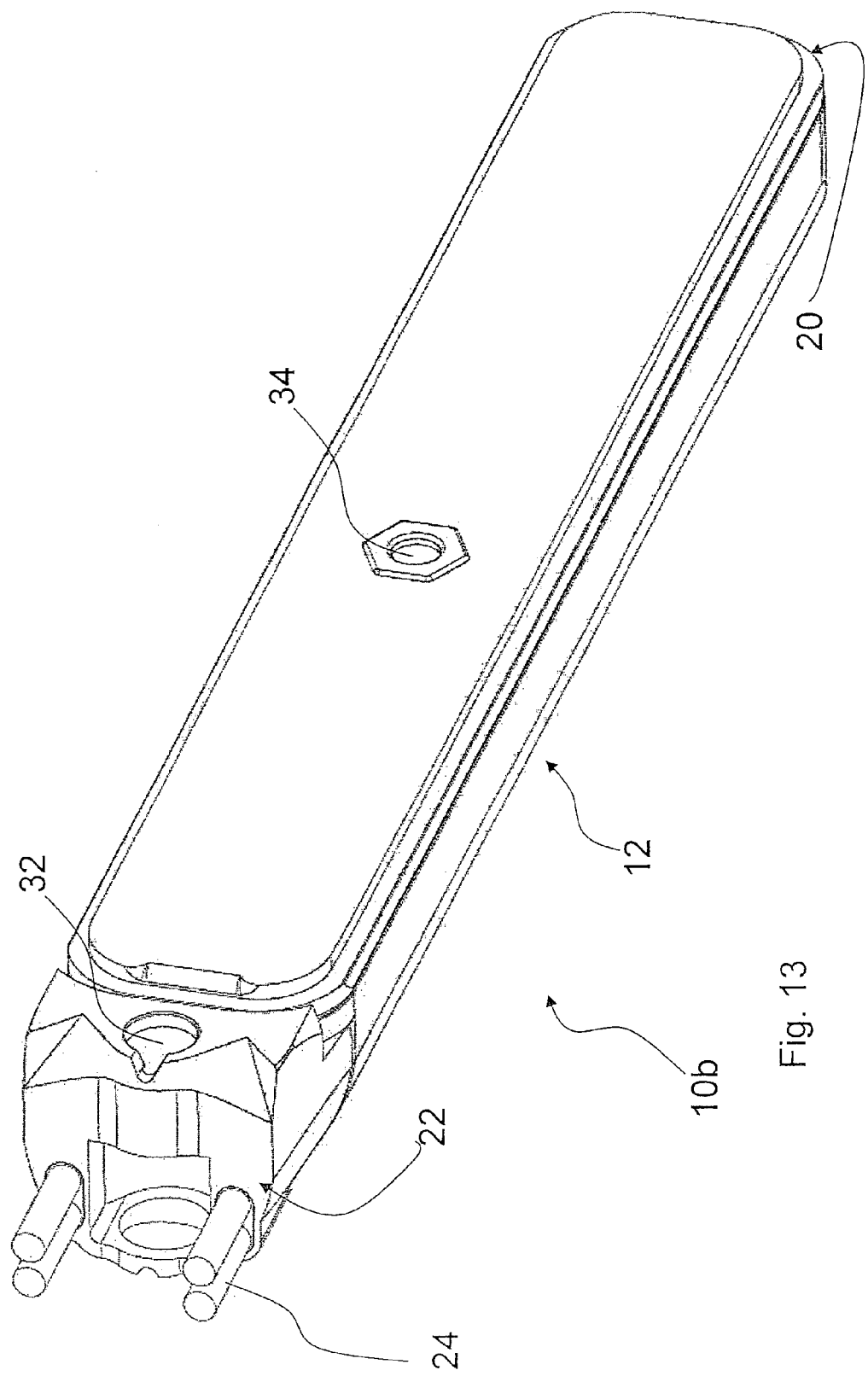
FIG. 13 is a perspective view of another embodiment of an on-board device according to the invention.

FIG. 13 illustrates an embodiment of the device 10b that differs from the ones illustrated and described above in that the groove 28 is absent. In order to increase the internal space of the device 10b, the part on the side of the upper end 20, "upstream" of the hole 34, could have a greater transversal size than the part on the side of the lower end 22, containing the holes 32, 34. In other words, the oblong hollow body 12 could be "stepped".

Figure 14:
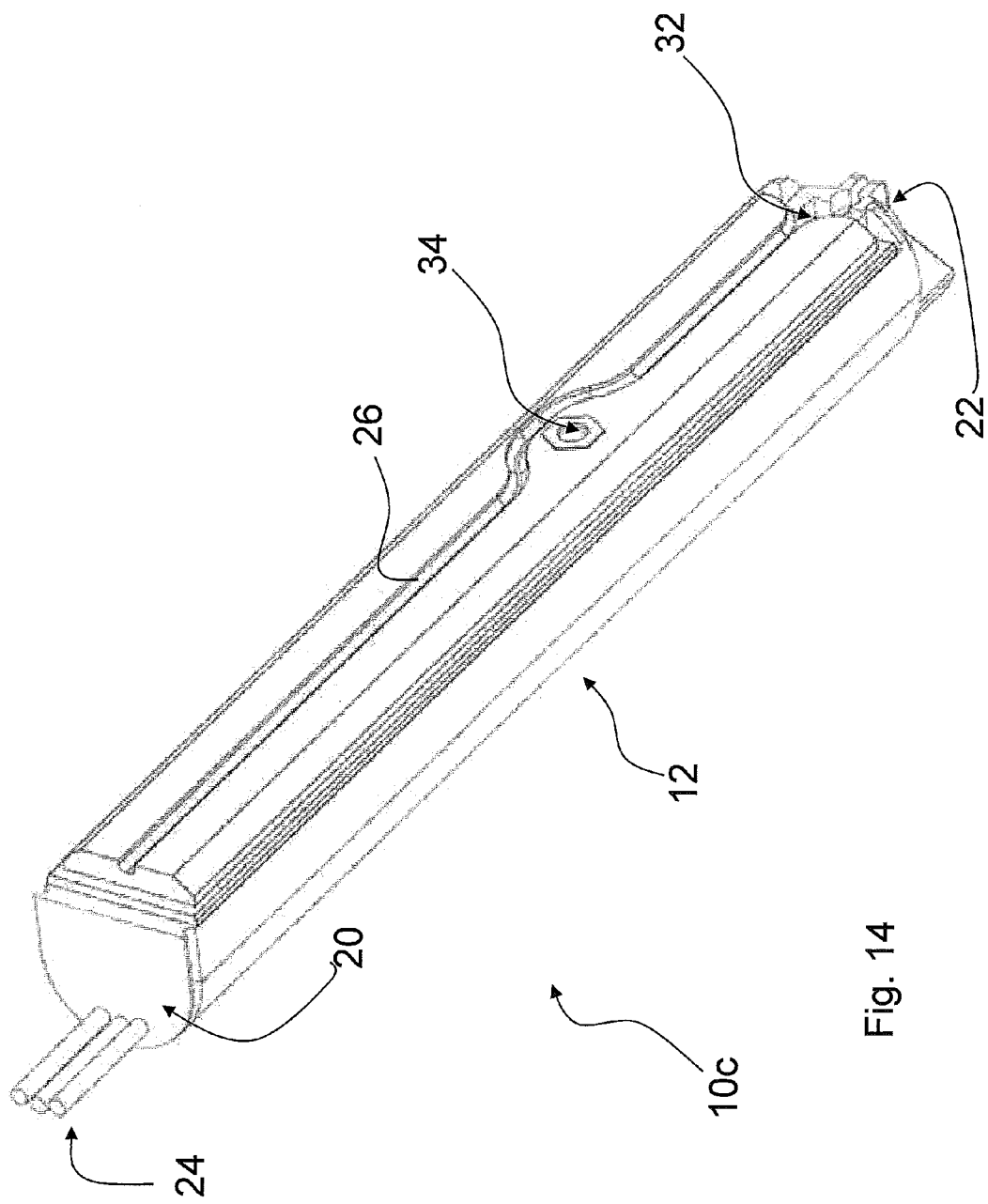
FIG. 14 is a perspective view of another embodiment of an on-board device according to the invention.

FIG. 14 illustrates an embodiment of the device 10c that differs from the one illustrated in FIG. 13 in that it has a groove 26 sized for housing one or more cables 24, which extends substantially in the main longitudinal direction of the oblong hollow body 12 to allow the possible passage of the cables 24 between the oblong hollow body 12 and the seat tube 112 (or the seat post 130). The cables 24 are also shown, as an example, exiting the upper end 20 of the oblong body 12.

The cables 24 can also exit from the side surface of the oblong hollow body 12, on the bottom of the groove 26 for housing the cables where provided for.

Such a groove for cables 26, or even more than one, can also be present in the other embodiments shown.

Figure 15:
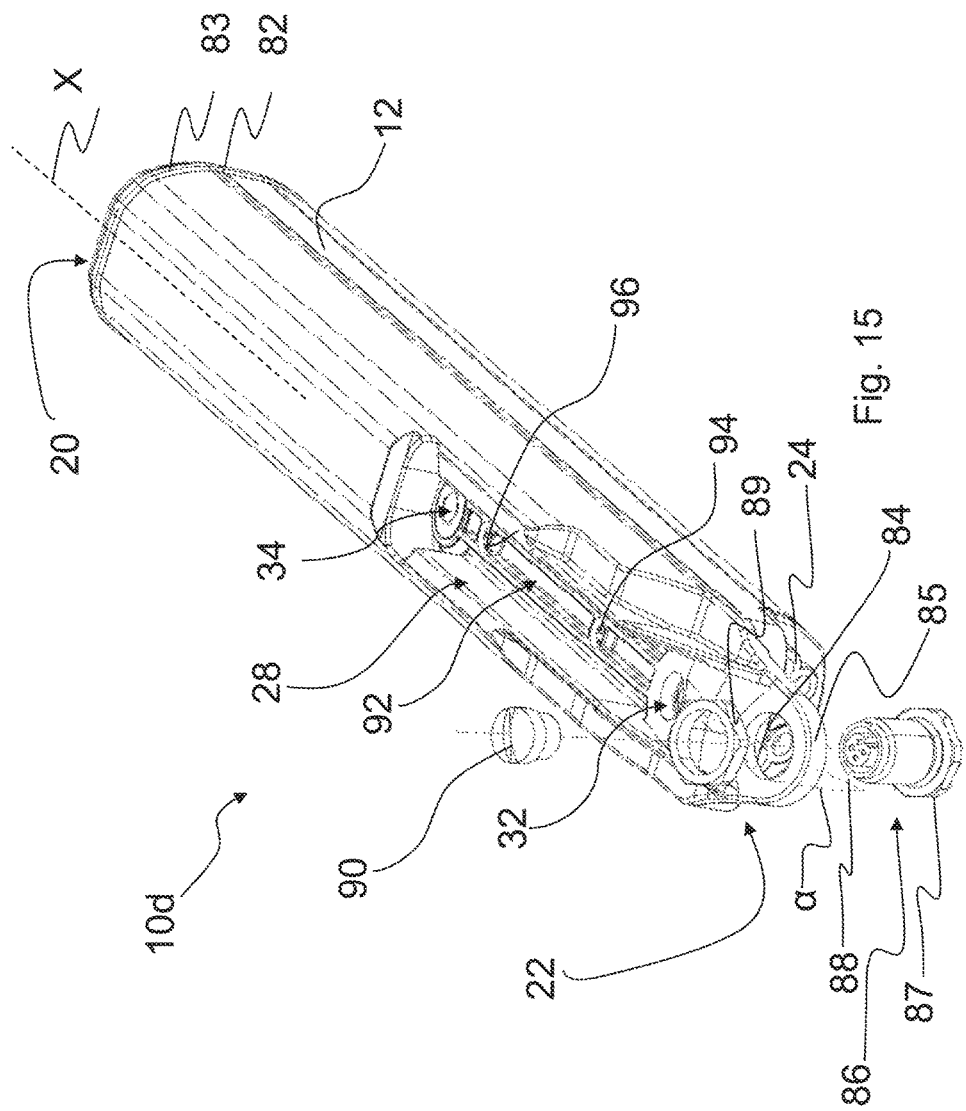
FIG. 15 is a perspective view of another embodiment of an on-board device according to the invention.

FIG. 15 illustrates another embodiment of the device 10d, described herein as to what differs with respect to the embodiment illustrated in FIGS. 2-8.

The device 10d comprises a groove 82 extending in a direction transversal to axis X, in which an anti-vibration insert 83 is seated, preferably in a removable manner. The groove 82 is shown substantially at the upper end 20 of the device 10d, but it could be elsewhere, just as there could be other grooves with anti-vibration insert. The anti-vibration insert 83 is one or a pair of O-rings made of rubber, silicone or other elastomeric materials and it has the function, indeed, of absorbing the vibrations particularly when the device 10d is inserted in the seat tube 112 of the bicycle.

The device 10d further comprises a seat 84 for a removable connector 86 fixed to one of the cables 24, leading to the inner battery the device 10d or to a recharging circuit thereof. By coupling the removable connector 86 with a matching removable connector 174 (FIG. 16) of a cable 176 leading to a power supply source, possibly through a recharging device, it is therefore possible to recharge the battery of the device 10d.

The seat 84 is preferably made in a flange 85 projecting at the lower end 22 of the device 10d. The flange 85 preferably lies in a plane that is slightly inclined with respect to the axis X (angle α) so that it and the connector 86 do not interfere with the inserts 166, 168 during insertion of the device 10d into the seat tube 112. The seat 84 is preferably a smooth hole.

The removable connector 86 is equipped with a peripheral flange 87 and an external threading 88 to receive a nut 89. In order to fix the removable connector 86 in position, the flange 85 of the seat 84 is clamped between the peripheral flange 87 and the nut 89 when the nut 89 is screwed onto the external threading 88.

The removable connector 86 can be differently coupled with the seat 84, for example screwed into an internal threading of the seat 84 or forced into the seat 84.

The removable connector 86 is preferably equipped with a cap 90 to protect its terminals when it is not coupled with the matching removable connector 174.

Figure 16:
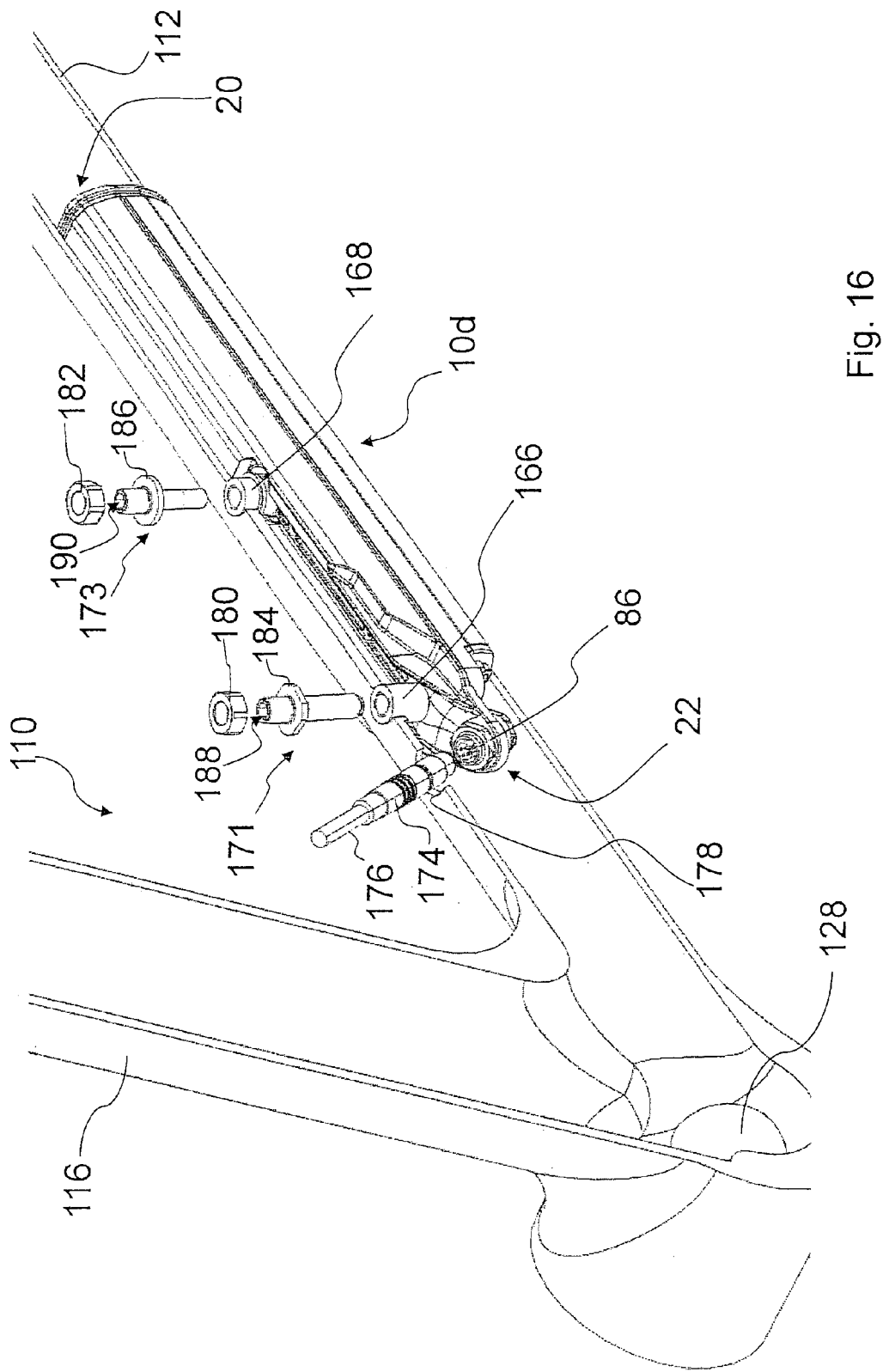
FIG. 16 is a perspective and partially exploded view of the on-board device of FIG. 15, in the installed condition, wherein the seat tube of the bicycle is shown in section and in a mounted condition of a connector.

As shown in FIG. 16, when the device 10*d* is mounted in the seat tube 112, in the frame 110 of the bicycle a hole 178 is made for gaining access to the connector 86, having a diameter adjusted to the diameter of the matching connector 174. In this way, the recharging of the inner battery of the device 10*d* can take place without dismounting it from the frame 110.

For the sake of completeness, FIG. 16 also shows different means for fastening the bottle cage (cfr. the bottle cage 194 of FIG. 17) and the device 10*d* with respect to the screws 170, 172 shown in FIG. 7. Such fastening means comprises two stud bolts 171, 173 to be screwed into the inserts 166, 168 of the frame 112 and into the holes 32, 34 of the on-board device 10*d*, the bottle cage being fixed through nuts 180, 182 to the stud bolts 171, 173. The stud bolts 171, 173 preferably comprise a flange 184, 186 suitable for abutting outside of the frame 110, and a recessed hexagonal seat 188, 190 or another seat so shaped as to be manoeuvrable by a tool to clamp them. Just as an example, the flange 184 is shown square and the flange 186 is shown round, but both of the flanges 184 and 186 can be round or square or have another shape that allows them to be manoeuvred through a clamping tool as an alternative to the use of the recessed hexagonal seat 188, 190.

Alternatively, as shown in FIG. 17, when the device 10*d* is mounted in the seat tube 112, in the frame 110 of the bicycle a seat 192 is made for housing the removable connector 86, to be used in an analogous way and as an alternative to the seat 84 of the device 10*d*.

For the sake of completeness, FIG. 17 also shows a bottle cage 194.

Also in this case, the recharging of the inner battery of the device 10*d* can take place without dismounting it from the frame 110.

Turning back to FIG. 15, the device 10*d* further comprises, on the bottom of the groove 28 and between the holes 32 and 34 intended for fastening the device 10*d* at the bottle cage, a seat 92 for fixing a shim (not shown) to be applied in the case in which the inserts 166, 168 of the seat tube 112 project too little inside the seat tube 112. In the embodiment shown, the seat 92 comprises two threaded holes 94, 96, but it is possible to use any other means for fixing such a shim.

In the device 10*d* there could be just one of the groove 82 with anti-vibration device 83, the seat 84 for a removable connector 86, and the seat 92 for a shim.

Moreover, each of the groove 82 with anti-vibration device 83, the seat 84 for a removable connector 86, and the seat 92 for a shim could also be provided for in the other embodiments of the on-board device.

FIGS. 18 and 19 show a first embodiment of a support 200 for mounting an on-board device of a bicycle externally on the frame 110, in particular an on-board device 10, 10*a*, 10*b*, 10*c*, 10*d* as described above.

The support 200 is oblong shaped, having substantially the shape of the side surface or of the shell of a hollow solid. The support 200 has a first wall 202, a second wall 204 opposite thereto and two joining walls 206, 207 between them. There are no end walls.

The walls 202, 204, 206, 207 are so shaped as to form, on the outside, a support 200 that is sufficiently aerodynamic and, internally, an oblong seat 208 for housing the on-board device 10, 10*a*, 10*b*, 10*c*, 10*d*, open at both longitudinal ends.

The first wall 202 has first openings 210, one of which is intended to receive a shank of a first fastening device 214 to the frame 110, such as a screw, and second openings 212, one of which is intended to receive a shank of a second fastening device 216. The first openings 210 and the second openings 212 are spaced along a longitudinal direction Y of the support 200.

Just as an example, three first openings 210 are shown, but there could be less first openings 210, even just one, or more than three.

Each first opening 210 is a multi-hole opening, namely an opening having a shape corresponding to plural aligned circular holes having a distance between centres that is preferably smaller than the diameter as shown. The multiple holes are aligned along a direction Z transversal to the support 200. In the embodiment shown, each opening 210 corresponds to two aligned holes, but these could be more than two.

Each first opening 210 is in this way configured to receive a shank of the first fastening device 214 alternatively in one of the two aligned holes—or in each of the aligned holes if there are more than two—in other words alternatively in positions spaced apart in the first opening 210 along the transversal direction Z. The shank of the fastening device 214, if suitably sized, cannot slide in the opening 210 and therefore its position along the transversal direction Z, once the hole to be used has been set, is fixed.

Alternatively, each first opening 210 could be configured like a slot (cfr. the second openings 212), having a major axis extending along the transversal direction Z of the support 200. Each slot-type opening 210 is configured to receive the shank of the first fastening device 214 in numberless positions spaced apart in the first opening 210 along the transversal direction Z, but the shank of the fastening device 214 can slide in the opening 210 and therefore vibrate if not properly clamped on the frame 110.

Just as an example, in the first wall 202 of the support 200 three second openings 212 are shown, but there could be less second openings 212, even just one, or more than three.

Each second opening 212 is a slot having a major axis extending along the longitudinal direction Y of the support 200. The slot shape is hardly recognisable in FIGS. 18 and 19 since the major axis is not much longer than the minor axis, but in other embodiments the slot could be more elongated. Alternatively, just some of the second openings could be slot shaped, or with multiple holes similarly to the first openings 210 shown, but with the holes aligned along the longitudinal direction Y of the support 200.

Each second opening 212 is in this way configured to receive a shank of the second fastening device 216 to the frame 110, in two or more positions spaced apart in the second opening 212 along the longitudinal direction Y.

Still alternatively, one or more of the second openings 212 could be simple holes, configured to receive the shank of the second fastening device 216 in a single position.

Although the first openings 210 are shown equally spaced and grouped together, and the second openings 212 are shown equally spaced and grouped together, the first openings 210 could be alternated with the second openings 212 or the first and the second openings could be differently distributed along the longitudinal direction Y. The distances between the various openings 210, 212 can also be whatever, not necessarily constant.

The second wall 204 of the support 200 has two perforated projecting seats 218, 219 for two devices 220, 221 for fastening to the on-board device, like for example screws.

The perforated projecting seats 218, 219 preferably have through slots as shown, having longer axis along the longitudinal direction Y of the support 200. In this way, thanks also to the opening of the seat 208 at both ends, the on-board device 10, 10*a*, 10*b*, 10*c*, 10*d* can be made to slide in the seat 208 along the longitudinal direction Y of the support 200, namely along the longitudinal axis X of the on-board device, and be housed in at least two spaced apart positions.

Similarly, the degree of freedom in longitudinal positioning of the on-board device 10, 10*a*, 10*b*, 10*c*, 10*d* in the support 200 can be obtained with non-perforated projecting seats 218, 219 for forced coupling, without using the fastening devices 218, 219 between the on-board device 10, 10*a*, 10*b*, 10*c*, 10*d* and the support 200.

Alternatively, the perforated projecting seats 218, 219 can be equipped with a simple circular hole, forcing the position of the on-board device 10, 10*a*, 10*b*, 10*c*, 10*d* in the seat 208 of the support 200 when the fastening devices 218, 219 are inserted.

The projecting seats 218, 219 are sized, along the transversal direction Z, similarly to the inserts 166, 168 of the frame 110 intended for fastening the bottle cage 194, so that the seat 208 is specifically configured for the on-board device 10, 10*a*, 10*b*, 10*c*, 10*d* described above, being configured like the inside of the seat tube 112 at the bottle cage.

As shown, preferably the first wall 202 and the second wall 204 are opposite one another and offset in the longitudinal direction Y of the support 200, so that the support 200 has the shape of the shell surface of a hollow solid having oblique base and top with respect to the longitudinal axis Y. In this way it is possible to easily gain access to the first openings 210 with a tool for manoeuvring the first fastening element 214, such as a screwdriver, while still offering, in the longitudinal direction Y, a length suitable for containing and supporting the on-board device 10, 10*a*, 10*b*, 10*c*, 10*d*.

In order to allow easy access also to the second openings 212 with a tool for manoeuvring the second fastening element 216, the second wall 204 preferably has one or more openings such as the openings 222, 223 shown, which also have the function of making it lighter.

Openings 224, 225 for weight reduction and/or for gaining access to the fastening devices can also be made in the joining walls 206, 207 as shown.

The position of the first openings 210 and of the second openings 212 in the first wall 202 could be inverted, making the second openings 212 accessible to manoeuvre the second fastening element 216 directly and the first openings 210 to manoeuvre the first fastening element 214 through the openings 222, 223.

The support 200 is fixed to the frame 110 by bringing the first wall 202 up to an element of the frame 110, inserting the fastening device 214 in a suitable position among all those offered by the first openings 210, and inserting the fastening device 216 in a suitable position among all those offered by the second openings 212, and tightening them. The on-board device 10, 10*a*, 10*b*, 10*c*, 10*d* is then inserted in the seat 208 from one of its open longitudinal ends and made to slide along the longitudinal direction, until the openings of the seats 218, 219 are aligned with the holes 32, 34. Through the fastening devices 220, 221, the on-board device 10, 10*a*, 10*b*, 10*c*, 10*d* is finally fastened to the support 200 and therefore to the frame 110.

As an example, in FIGS. 20 and 21 the support 200 is shown mounted on a horizontal tube 124 of the rear stay, respectively without and with the on-board device inserted, and in FIG. 22 the support 200 is shown mounted on the down tube 116, with the on-board device inserted. Just as an example, the on-board device shown in FIGS. 21 and 22 is in particular the on-board device 10*d* of FIG. 15.

When in particular the frame element is an oblong element, like for example the horizontal tube 124 of the rear stay or the down tube 116, the support 200 is oriented in such a manner that the longitudinal direction Y is parallel and therefore coincides with the longitudinal direction of the frame element 124, 116, and such that the transversal direction Z is parallel and therefore coincides with the transversal direction of the frame element 124, 116.

Since typically the horizontal tube 124 of the rear stay has a bend and in general has a size and a profile that depend on the frame manufacturer and on the model, just as other oblong frame elements, the presence of many positions for the fastening device 214 spaced apart along the transversal direction Z is exploited to fix the support 200 to the frame element so that the support 200, and the on-board device contained in it, extend as far as possible along such a frame element, with advantages in terms of appearance, aerodynamics and safety since the device can be so mounted as to project as little as possible transversally from the frame element 110. Indeed, by suitably selecting the position of the first fastening device 214 among all of those provided for—and also the position of the second fastening device 216 where different positions are provided for—the support 200 can adapt to different amounts of divergence from a rectilinear profile of the frame element to which it is fixed.

Moreover, the support 200, with its oblique shape, is in particular useful in the case of fastening at the bottom to the frame 110, close to the bottom bracket assembly 128, since the offsetting between the first and second walls 202, 204 allows the support to be easily fixed to the frame 110 despite the presence of pedal cranks 148, 149 and toothed wheels 154, while still then housing the on-board device 10, 10*a*, 10*b*, 10*c*, 10*d*, once it has been made to slide into the seat 208, in close proximity to the bottom bracket assembly 128, in a position at least partially hidden by the pedal crank 149 and/or by the toothed wheels 154.

FIGS. 23 and 24 show a second embodiment of a support 200*a* for mounting an on-board device of a bicycle externally on the frame 110, in particular an on-board device 10, 10*a*, 10*b*, 10*c*, 10*d*.

In this embodiment, the oblong seat 208 for the on-board device is open at a longitudinal end, but closed by an end wall 226 at the opposite longitudinal end.

The seats 218, 219 for the fastening devices 220, 221 of the on-board device are threaded holes made in a projecting rib 229, suitable for engaging with the groove 28 of the device 10*d*. By providing for threaded holes, the longitudinal position of the on-board device in the support 200*a* is uniquely defined when the fastening devices 220, 221 are used (not shown in FIGS. 23, 24). It is however possible to use just the forced engagement of just the rib in the groove 28 of the on-board device or, vice-versa, just the engagement of the fastening devices 220, 221 in the holes 32, 34 of the on-board device, avoiding the projecting rib 229 and/or the groove 28.

The end wall 226 has a seat 228, such as a circular hole, for the removable connector 86 of the power supply and/or recharging cable 24 of the on-board device or for another connector, to be used in an analogous manner and as an alternative to the seat 84 of the device 10d described with reference to FIG. 15.

In this embodiment, the first and second walls 202, 204 are not offset. Moreover, with respect to the support 200, one of the two joining walls 207 is absent.

Figure 25:
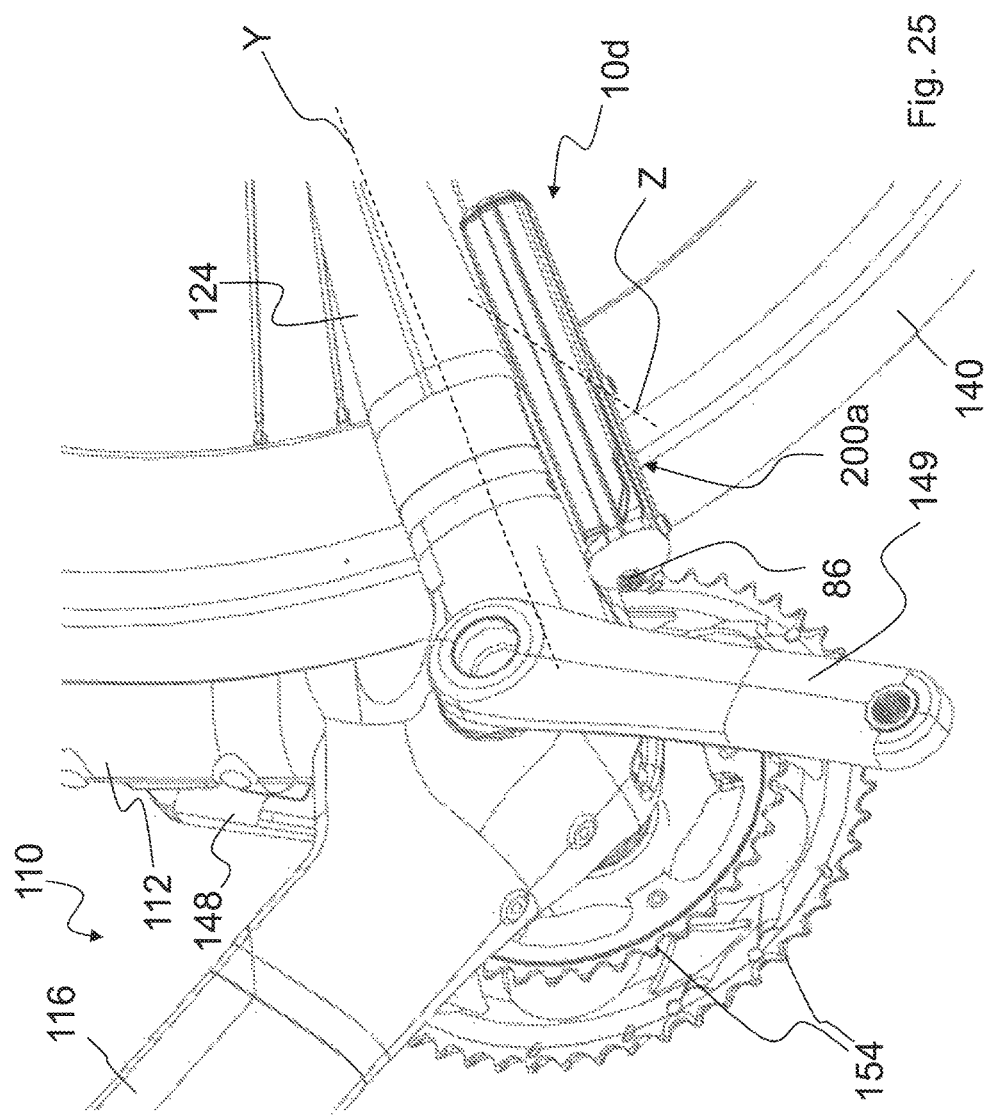
FIG. 25 shows the support of FIGS. 23-24 mounted on a horizontal tube of the rear stay.

As an example, in FIG. 25 the support 200a is shown mounted on a horizontal tube 124 of the rear stay, with the on-board device inserted. Just as an example, the on-board device shown is in particular the on-board device 10d of FIG. 15.

The various differences of the embodiment of the support 200a with respect to the embodiment of the support 200 are independent from one another and embodiments can be devised that combine aspects of the one with aspects of the other.

Figure 26:
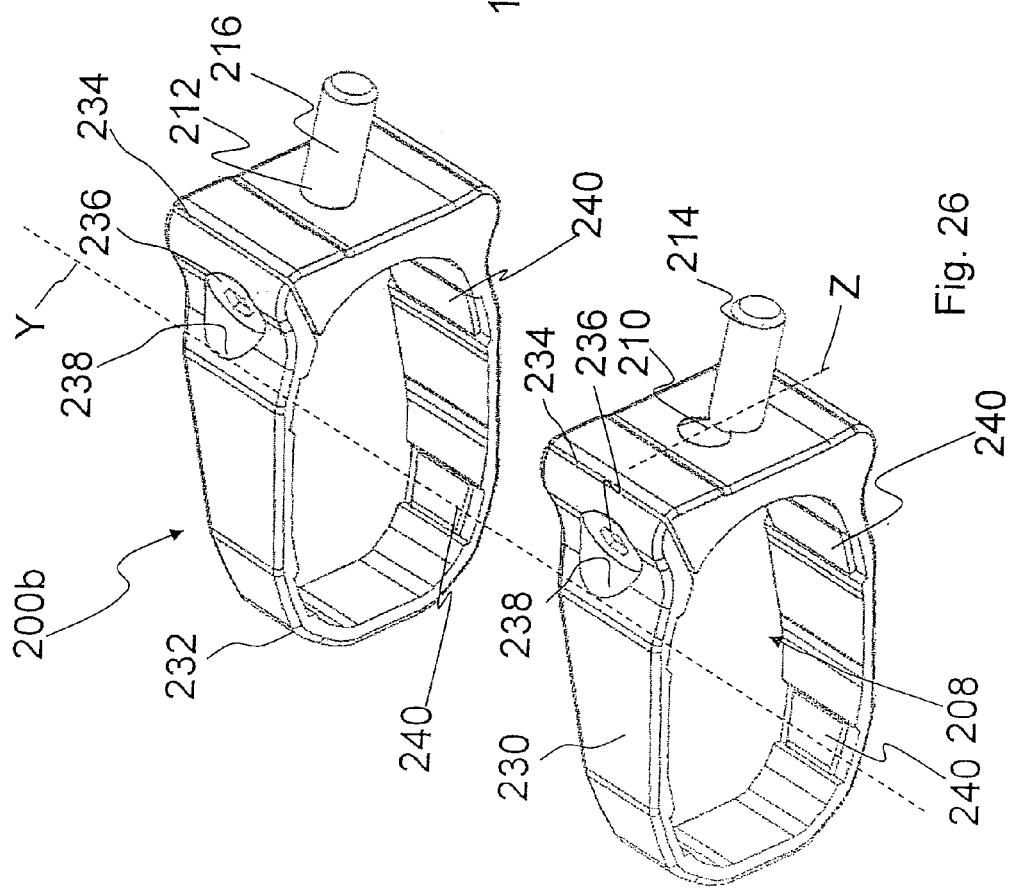
FIG. 26 shows a third embodiment of a support for mounting a bicycle on-board device externally on the frame.

FIG. 26 shows a third embodiment of a support 200b for mounting an on-board device of a bicycle externally on the frame 110, in particular an on-board device 10, 10a, 10b, 10c, 10d.

The support 200b comprises two straps 230, 232 suitable for clamping around the on-board device 10, 10a, 10b, 10c, 10d and together defining the seat 208 for the on-board device 10, 10a, 10b, 10c, 10d. There could also be three or more straps.

The first strap 230 comprises a first opening 210 and the second strap comprises a second opening 212, each configured in one of the ways described above in relation to FIG. 18. In the embodiment shown, the first opening 210 is configured to allow two positions of the shank of the first device 214 for fastening to the frame, spaced along the transversal direction Z of the seat 208 and therefore of the support 200b as a whole and of the oblong bicycle element to which the support 200b is fixed, while the second opening 212 is configured as a single hole and therefore allows a single position of the shank of the second device 216 for fastening to the frame, even if there could be a second opening 212 analogous to those described above, which allows two or more positions spaced along the longitudinal direction Y of the seat 208 and therefore of the support 200b as a whole and of the oblong bicycle element, as well as a second opening 212 that also allows two or more positions spaced along the transversal direction Z of the seat 208 and therefore of the support 200b as a whole and of the oblong bicycle element (cfr. FIG. 27).

By forming the two openings 210, 212 in different straps, it is possible to change the distance between the first and the second fastening device 214, 216 to adapt it to the oblong bicycle element 110 and/or to the on-board device 10, 10a, 10b, 10c, 10d, by simply changing the distance between the straps 230, 232. A single first opening 210 and a single second opening 212 are therefore sufficient, as shown. Nevertheless, there could be more first openings 210 and/or more second openings 212.

Preferably, each strap 230, 232 has means for adjusting the clamping force around the on-board device 10, 10a, 10b, 10c, 10d, by loosening which it is possible to make the on-board device 10, 10a, 10b, 10c, 10d slide along the frame element 110 or remove it from the support 200b. Such means for adjusting the clamping force comprises, in the embodiment shown just as an example, a split 234 of the strap 230, 232 and a screw 236 extending in a hole 238 passing through an end of the strap 230, 232 near to the split 234 and in a blind hole (not visible) in the opposite end of the strap, again close to the split 234.

Each strap 230, 232 also preferably has some rubber inserts 240 on its inner surface, having an anti-vibration function.

Anti-vibration rubber inserts can be provided in the supports 200, 200a of the other embodiments, on the surface of the seat 208 intended for contact with the on-board device 10, 10a, 10b, 10c, 10d.

Figure 29:
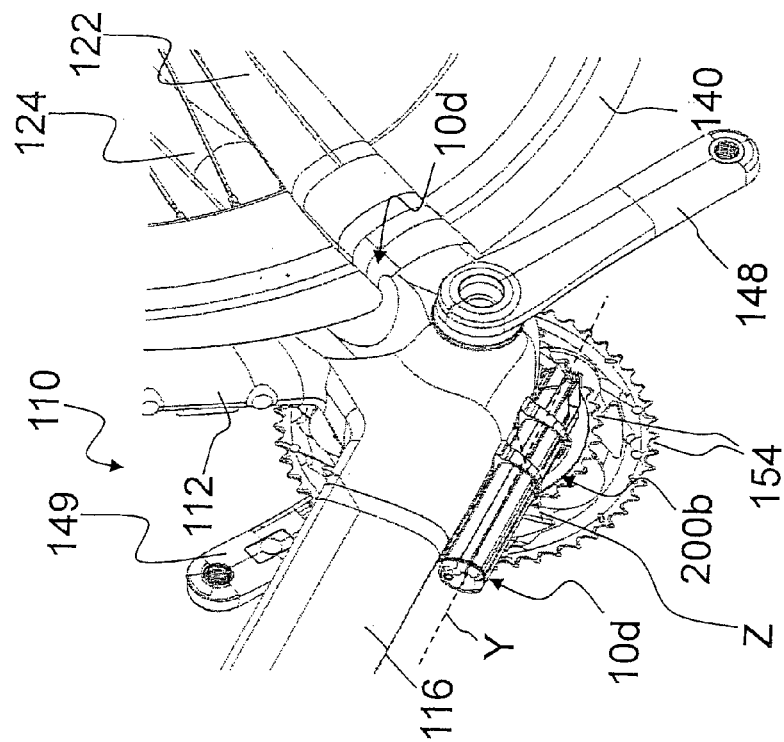
FIG. 29 shows the support of FIG. 26 mounted on the down tube.

As an example, in FIGS. 27 and 28 the support 200b is shown mounted on a horizontal tube 124 of the rear stay, respectively without and with the on-board device inserted, and in FIG. 29 the support 200b is shown mounted on the down tube 116, with the on-board device inserted. Just as an example, the on-board device shown in FIGS. 28 and 29 is in particular the on-board device 10d of FIG. 15.

In FIG. 27 it can be seen that the first and the second fastening device 214, 216 are inserted in positions not corresponding in the first and second strap 230, 232 so that the on-board device 10d extends as far as possible along the horizontal tube 124 of the rear stay, as can be seen in FIG. 28.

Figure 30:
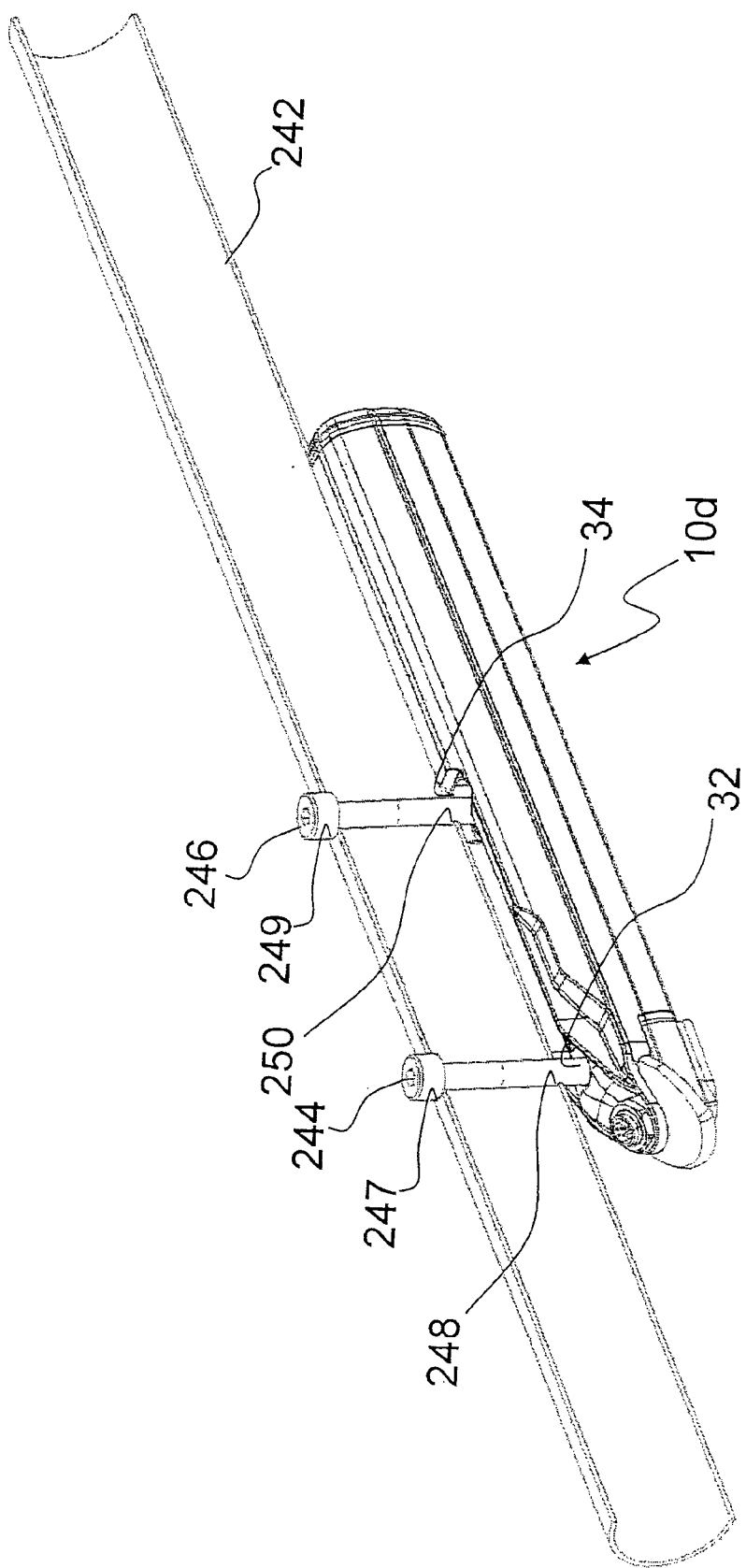
FIG. 30 shows the on-board device of FIG. 15 mounted directly externally on the frame.

In FIG. 30 the on-board device 10d of FIG. 15 is shown mounted directly externally on an oblong element of the frame 110 or able to be associated with the frame, such as the seat post 130 or the handlebars 134, generically indicated as oblong bicycle element 242. The on-board device 10d is fastened through fastening elements 244, 246, such as screws, extending transversally through the oblong bicycle element 242, in two pairs of aligned through holes 247, 248 and 249, 250 of the oblong bicycle element 242. The fastening elements 244, 246 screw into the threaded holes 32, 34 of the on-board device 10d.

The direct mounting externally to the frame described above is also possible for the other on-board devices 10, 10a, 10b, 10c described above, if provided with the holes 32, 34.

The above has therefore described an innovative assembly of an on-board device 10, 10a, 10b, 10c, 10d and support 200, 200a, 200b therefor that offers the possibility of mounting the on-board device 10, 10a, 10b, 10c, 10d in one or more positions between outside the frame 110, directly or through the support and, without the support 200, 200a, 200b, inserted in a bicycle oblong element or suspended in a bicycle oblong element, in particular inserted in the seat tube 112 at the bottle cage 194, or suspended in the seat tube 112 or suspended from the seat post 130.

Also described is an innovative bicycle frame 110 or seat post 130 or handlebars 134 with on-board device 10, 10a, 10b, 10c, 10d mounted on an oblong element thereof, in particular a top tube of the rear stay or the down tube 116 close to the bottom bracket assembly 128, wherein the on-board device 10, 10a, 10b, 10c, 10d is housed in the support 200, 200a, 200b and can be positioned, with respect to the oblong element, in at least two different positions along the longitudinal direction Y of the oblong element.

Also described is an innovative bicycle frame 110 or seat post 130 or handlebars 134 with on-board device 10, 10a, 10b, 10c, 10d mounted on an oblong element thereof, in particular a horizontal tube of the rear stay or the down tube 116 close to the bottom bracket assembly 128, wherein the on-board device 10, 10a, 10b, 10c, 10d is housed in the support 200, 200a, 200b and can be positioned, with respect to the oblong element, with at least two different inclinations with respect to the longitudinal direction Y of the oblong element.

Also described is an innovative support 200, 200a, 200b for a bicycle on-board device 10, 10a, 10b, 10c, 10d having a seat for a removable connector 86 of a cable 74, more preferably of a recharging cable of the on-board device 10, 10a, 10b, 10c, 10d.

Also described is an innovative bicycle frame 110 with a seat 192 for mounting a removable connector 86 of a cable 74, more preferably of a recharging cable of the on-board device 10, 10a, 10b, 10c, 10d able to be inserted in the frame 110. Similarly, the seat can be provided in a seat post 130 or handlebars 134.

Also described is an innovative bicycle frame 110 with an on-board device 10, 10a, 10b, 10c, 10d inserted in the seat tube 112 and a hole 178 for gaining access to a removable connector 86 of a cable 74, more preferably of a recharging cable of the on-board device 10, 10a, 10b, 10c, 10d. Similarly, the access hole can be provided in a seat post 130 or handlebars 134 in which the on-board device 10, 10a, 10b, 10c, 10d is inserted.

Although they have been shown in connection with the on-board device 10d of FIG. 15, the supports 200, 200a, 200b are suitable for any of the on-board devices 10, 10a, 10b, 10c shown above and their described variants, and they can easily be adapted to generic on-board devices, not having the described means for fixing inside the seat tube 112 or the seat post 130.

In the described embodiments, advantageously the groove 28, 28a, with the means 32, 34 for fastening the screws of the bottle cage where provided for, and/or the alternative fastening means such as the expander 70, can be made in a metallic plate that can be removably associated with the oblong hollow body 12, for example made of a plastic material. In this way, it is possible to increase the strength and/or make a single oblong hollow body and a series of plates, each adapted to different sizes and/or distances between centres of inserts 166, 168 for fastening the bottle cage.

Alternatively, at the expenses of the size of the internal cavity 13, it is possible to provide more than one groove 28, 28a, with possible fastening means to the oblong bicycle element and/or to the support, in different angular positions (about axis X).

It should be understood that the on-board device described above is also suitable for seat tubes or oblong frame elements, handlebars and seat posts with non-circular cross section and/or for frames with integrated seat post.

Moreover, in the above reference has often been made to the seat tube 112 and to the inserts 166, 168 provided in it for fastening the bottle cage through the fastening devices 170, 172 or 171, 173. Indeed, as described in the introductory part of the disclosure, typically bicycle frames have such inserts 166, 168 for arrangement for fastening the bottle cage along the seat tube, said inserts being standard in terms of the threading, in terms of their dimensions, and in terms of their distance between centres. The on-board device described above is therefore preferably configured to be able to be fixed at such inserts 166, 168, preferably inserted in the seat tube 112, to exploit the existing standard and therefore be substantially universal.

Despite this, the on-board device described above can be inserted inside or mounted outside of another bicycle oblong element, for example in the down tube 116 or in the head tube 126 or anywhere else there are inserts analogous to those provided for fastening the bottle cage.

The reference to an oblong element of the frame 110 or in particular to the seat tube 112 should therefore be taken more in general as a reference to a bicycle oblong element, including the seat post 130 and the handlebars 134.

More generally, the on-board device described above can be applied at inserts or reinforcements of the bicycle in one piece therewith not corresponding to the standards of the bottle cage in terms of distance between centres, dimensions and/or threadings, by simply adapting its holes 32, 34 and/or the groove 28, 28a. Similarly, the support 200, 200a, 200b described above can have fastening means to the on-board device that does not correspond to the standard inserts of the bottle cage.

The on-board device 10, 10a, 10b, 10c, 10d can contain just one of the battery power supply unit 14 and the circuit board 16. The circuit board 16, if provided for, can contain devices and circuits different from those described above.

When it is not provided for there to be coupling with the fastening means 170-173 of the bottle cage, the holes 32, 34 can be smooth holes, intended for example for coupling with expansion devices, or different seats for fastening elements for fastening the on-board device 10, 10a, 10b, 10c, 10d to the bicycle or to the support 200, 200a, 200b.

Of course, one skilled in the art, in order to satisfy specific and contingent requirements, can make several modifications and variants to the device described above, all of which are in any case encompassed within the scope of protection of the present invention as defined by the following claims.

What is claimed is:

1. A support for removably fastening a bicycle on-board device having an oblong shape along a bicycle oblong element, wherein the support has at least a first opening configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of at least two first positions spaced apart in said first opening, the two first positions being spaced along a second direction, substantially transversal to the first direction, which in use is a direction transversal to the oblong element, wherein said at least one first opening comprises a plurality of first openings spaced apart along the first direction, wherein said at least one second opening comprises a plurality of second openings spaced apart along the first direction.

2. A support for removably fastening a bicycle on-board device having an oblong shape along a bicycle oblong element, wherein the support has at least a first opening configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of at least two first positions spaced apart in said first opening, the two first positions being spaced along a second direction, substantially transversal to the first direction, which in use is a direction transversal to the oblong element, wherein said at least one first opening comprises a plurality of first openings spaced apart along the first direction, wherein the support defines an oblong seat for the on-board device having a portion that projects into the on-board device for fastening the oblong seat to the on-board device, wherein the oblong seat for the on-board device is defined by a first wall having said at least one first opening and at least one second opening, a second wall at which said portion that projects into the on-board device is located, and at least one joining wall between the first wall and the second wall.

3. The support according to claim 2, wherein the first wall and the second wall are opposite one another and offset in the longitudinal direction of the support.

4. The support according to claim 3, wherein the oblong seat for the on-board device is open at both longitudinal ends.

5. The support according to claim 3, wherein the oblong seat for the on-board device is open at a longitudinal end and closed by an end wall at the opposite longitudinal end.

6. The support according to claim 2, wherein the oblong seat for the on-board device is open at both longitudinal ends.

7. The support according to claim 2, wherein the oblong seat for the on-board device is open at a longitudinal end and closed by an end wall at the opposite longitudinal end.

8. The support according to claim 7, wherein said end wall has a seat for a removable connector of a cable.

9. The support according to claim 8, wherein the removable connector is selected from the group consisting of a power supply cable, a recharging cable of the on-board device, and a power supply and recharging cable of the on-board device.

10. The support according to claim 7, comprising at least one rubber insert on the surface of the seat intended for contact with the on-board device, having an anti-vibration function.

11. A support for removably fastening a bicycle on-board device having an oblong shape along a bicycle oblong element, wherein the support has at least a first opening configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of at least two first positions spaced apart in said first opening, the two first positions being spaced along a second direction, substantially transversal to the first direction, which in use is a direction transversal to the oblong element, wherein said at least one first opening comprises a plurality of first openings spaced apart along the first direction, further comprising at least two straps, the first opening and the second opening being formed in distinct straps.

12. The support according to claim 11, wherein each strap is configured such that the clamping force around the on-board device can be adjusted.

13. A support for removably fastening a bicycle on-board device having an oblong shape along a bicycle oblong element, wherein the support has at least a first opening configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of at least two first positions spaced apart in said first opening, the two first positions being spaced along a second direction, substantially transversal to the first direction, which in use is a direction transversal to the oblong element, wherein said at least one first opening comprises a plurality of first openings spaced apart along the first direction, wherein said at least one second opening is configured to receive the shank of the second fastening device in one of at least two second positions spaced apart in said second opening, the two second positions preferably being spaced along the first direction, wherein said at least one second opening comprises a plurality of second openings spaced apart along the first direction.

14. A support for removably fastening a bicycle on-board device having an oblong shape along a bicycle oblong element, wherein the support has at least a first opening having at least two distinct positions that are adjacent to each other and individually configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of said at least two distinct positions in said first opening, the two distinct positions being spaced along a second direction, substantially transversal to the first direction.

15. A support for removably fastening a bicycle on-board device having an oblong shape along a bicycle oblong element, wherein the support has at least a first opening configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of at least two first positions spaced apart in said first opening, the two first positions being spaced along a second direction, substantially transversal to the first direction, which in use is a direction transversal to the oblong element, wherein said at least one first opening comprises a plurality of first openings spaced apart along the first direction, wherein said at least one second opening is configured to receive the shank of the second fastening device in one of at least two second positions spaced apart in said second opening, the two second positions preferably being spaced along the first direction, wherein said at least one second opening comprises a plurality of second openings spaced apart along the first direction.

16. A support for removably fastening a bicycle on-board device having an oblong shape along a bicycle oblong element, wherein the support has at least a first opening configured to receive a shank of a first device for fastening to the oblong element and a second opening configured to receive a shank of a second device for fastening to the oblong element, the first opening and the second opening being spaced apart along a first direction, which in use is a longitudinal direction of the oblong element, the first opening being configured to receive the shank of the first fastening device in one of at least two first positions spaced apart in said first opening, the two first positions being spaced along a second direction, substantially transversal to the first direction, which in use is a direction transversal to the oblong element, wherein said at least one first opening comprises a plurality of first openings spaced apart along the first direction, wherein the on-board device is an electronic device for controlling operation of a bicycle.

17. The support according to claim 16, wherein said at least one second opening is configured to receive the shank of the second fastening device in one of at least two second positions spaced apart in said second opening, the two second positions preferably being spaced along the first direction.

18. The support according to claim 17, wherein each opening is independently selected from the group consisting of a slot defining numberless positions and a multi-hole opening.

19. The support according to claim 16, wherein the support defines a seat for the on-board device configured to house the on-board device in at least two positions spaced apart in said seat, the two positions being spaced along a longitudinal axis of the on-board device.

20. The support according to claim 16, wherein each opening is independently selected from the group consisting of a slot defining numberless positions and a multi-hole opening.

21. The support according to claim 16, wherein the support defines an oblong seat for the on-board device having a portion that projects into the on-board device for fastening the oblong seat to the on-board device.

22. The support according to claim 16, provided with one or more openings for gaining access to said at least one first opening and/or to said at least one second opening and/or for lightening purposes.

* * * * *